United States Patent [19]
Compton et al.

[11] Patent Number: 5,732,269
[45] Date of Patent: Mar. 24, 1998

[54] DATA ADAPTER TRANSPARENT TO APPLICATION I/O PATH

[75] Inventors: Scott Brady Compton, Hyde Park, N.Y.; John Poul Hartmann, Gentofte, Denmark; David Lee Meck, Hyde Park; Michael Allen Wright, Croton-on-Hudson, both of N.Y.

[73] Assignee: International Business Machines Corporation, Armonk, N.Y.

[21] Appl. No.: 426,592

[22] Filed: Apr. 21, 1995

[51] Int. Cl.$^6$ ............................................ G06F 13/00
[52] U.S. Cl. ...................... 395/680; 395/114; 395/701; 395/821
[58] Field of Search ........................ 395/200, 680, 395/701, 114, 821, 650

[56] References Cited

U.S. PATENT DOCUMENTS

| | | | |
|---|---|---|---|
| 4,821,178 | 4/1989 | Levin et al. | 395/184.01 |
| 5,168,554 | 12/1992 | Luke | 395/770 |
| 5,305,461 | 4/1994 | Feigenbaum et al. | 395/566 |
| 5,396,616 | 3/1995 | Venable | 395/500 |
| 5,420,965 | 5/1995 | Barker, III | 395/114 |
| 5,432,925 | 7/1995 | Abraham et al. | 395/500 |
| 5,448,734 | 9/1995 | Hubik et al. | 395/680 |
| 5,471,615 | 11/1995 | Amstsu et al. | 395/200.03 |
| 5,504,898 | 4/1996 | Klein | 395/671 |
| 5,506,945 | 4/1996 | Coutand | 395/114 |
| 5,537,548 | 7/1996 | Fin et al. | 395/200.04 |
| 5,572,659 | 11/1996 | Iwasa et al. | 395/182.04 |
| 5,572,690 | 11/1996 | Molnar et al. | 395/376 |

OTHER PUBLICATIONS

"Batch Pipes/MVS", IBM Batch Pipes/MVS, First Edition, Jun. 1994.

*Primary Examiner*—Christopher B. Shin
*Attorney, Agent, or Firm*—William A. Kinnaman, Jr., Esq.; Heslin & Rothenberg, P.C.

[57] ABSTRACT

An adapter interface function allows data to be acted on using resources owned by a corresponding application and without any modification to the application. The adapter interface can be applied to receive data from data sources not provided for in the access methods used by the application. Likewise, the adapter can be used to write data to data sinks not supported by the access methods used by the application. The adapter interface can be provided in an I/O control system or in access method programs. Adapters are written in an interpreted language to provide run-time execution and avoid program compile, assemble, and link edit requirements. A programing interface is provided to enable invocation of stored library programs.

44 Claims, 15 Drawing Sheets

DATA ADAPTER TRANSPARENT TO APPLICATION I/O PATH

BACKGROUND OF THE INVENTION

1. Technical Field

The present invention generally relates to data processing. More particularly, the present invention relates to transparently processing data outside an application.

2. Background Information

Many companies and individuals have spent considerable sums of money to re-develop one or more applications and/or to re-engineer the overall process including those applications to interface with and to capitalize on new capabilities, or exploit existing capabilities in a new manner. Those capabilities may include interfacing with data bases, using messaging and queuing, moving data from a mainframe operating system to a workstation in real time, etc. Businesses generally find it desirable that existing critical and complex applications be retained until the new capabilities or exploitations have become accepted.

As the demands on businesses and individuals have increased, so has the number and complexity of processes that must be performed within a given amount of time. In the past, related processes were executed serially in a computer where the data is generated and operated on in stages. This was the case even though multitasking and multiprocessing capabilities existed. As the amount of data to be processed has increased, and the number of processes that must be performed have increased, many businesses and individuals are finding that the processes cannot be completed within a necessary time frame using a serial data processing method.

In response to the problem of not being able to perform computer processes within a given time frame, technology has developed to allow the same businesses and individuals to operate several existing applications within a process concurrently through the use of pipelining. Parallel processing has enabled these businesses and individuals to significantly reduce the time required to perform processes that were previously performed serially. In the simplest terms, the technology allows a first application to process data, transfer the data as it is being written to a pipe (i.e., a first-in, first-out (FIFO) storage buffer), while a second application reads the processed data from the pipe and performs further processing thereon concurrently with the first application.

Although the use of pipelining to enable data flow parallelism in large-scale data processing systems has enabled significant processing performance increases, it has heretofore failed to address several problems. One problem is that, since the applications were developed for a serial process, some alterations may be necessary in order to allow parallel execution. Program modifications may not be possible, or acceptable in migrating the applications to a parallel environment. A second problem is that the operating system serialization algorithms may actually prevent the applications from running in parallel without modifications. Another problem is that, as the amount of data being processed through the pipeline increases, the resources required to allow concurrent processing have reduced the potential efficiency of pipelining.

In order to address the first problem, it is conventionally necessary to add new applications to the overall process that enable concurrent processing of the applications, and to maintain the processing requirements of the old process. Examples of this would be an application to "harden" data, i.e., copy the data being passed through a pipe to physical media in order to preserve the data.

This requirement is introduced by the use of a pipe as storage media rather than permanent storage (e.g., disks or tapes). The same function could be achieved by program modifications, however, this results in constraining the applications. Also, the addition of further applications causes further contention for resources and fails to address the second problem.

Thus, a need exists for a way to act on data outside the confines of existing applications without altering the applications or significantly increasing the resources required to act on the data.

SUMMARY OF THE INVENTION

Briefly, the present invention satisfies the need for acting on data outside of applications by providing a way to act on data after it is written by the application, but before it is transferred to media or another data sink; and to act on data after it is transferred from media or another data source, but before it is read by an application. The present invention also satisfies the need to minimize resources used by providing a way to act on data using resources owned by the application.

In accordance with the above, it is an object of the present invention to provide a way to act on data going to or coming from an application without modifying the application in any way.

It is another object of the present invention to provide a way to act on data outside the application using the resources already allocated to that application by the operating system.

It is another object of the present invention to provide a way to act on data outside the confines of a conventional data path of operating system components handling input and output operations, and return the acted-on data to the conventional data path.

It is still another object of the present invention to provide a way to obtain data from outside a conventional data path of operating system components handling input and output operations, act on that data and introduce the acted-on data into the conventional data path.

It is a further object of the present invention to provide a way to remove data from a conventional data path of operating system components handling input and output operations, act on that data and transfer the acted-on data to a destination other than that originally intended.

The present invention provides, in a first aspect, a method for processing data in a computer system including an application, an I/O control system and an access method controlling data transfer between the application and the I/O control system. The I/O control system controls data transfer between the access method and storage media. The method comprises steps of: passing data from the access method or the I/O control system to an adapter outside the application, the adapter being transparent to the application, the data having an origin and an intended destination other than the adapter; and acting on the passed data within the adapter under computer system resources owned by the application and producing an output. The data processing method may further comprise a step of passing the output from the adapter back to the I/O control system or access method. The present invention also provides a system for performing the method of this aspect.

The present invention provides, in a second aspect, a method for processing data in a computer system including an application, an I/O control system, a storage media and an access method controlling data transfer between the application and the I/O control system. The I/O control system controls data transfer between the storage media and the access method. The method comprises steps of: issuing a read request from the application, the read request targeting the storage media; passing data from a data source other than the storage media to an adapter outside the application, the adapter being transparent to the application; and acting on the passed data within the adapter under computer system resources owned by the application and producing an output. The method may further comprise a step of passing the output from the adapter back to the I/O control system or the access method. The present invention also provides a system for performing the method of this aspect.

The present invention provides, in a third aspect, a method for processing data in a computer system including an I/O control system controlling data transfer within a pipeline including a plurality of elements, the plurality of elements including a plurality of applications and at least one pipe connecting the plurality of applications. The method comprises steps of: passing data from an origin to an adapter, wherein the adapter is separate from and transparent to the plurality of elements, and wherein the origin is either external to the pipeline or one of the plurality of elements therein; and acting on the data within the adapter under computer system resources owned by one of the plurality of applications. The method may further comprise a step of passing the output from the adapter to a destination, wherein the destination is either external to the pipeline or one of the plurality of elements therein. The present invention also provides a system for performing the method of this aspect.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
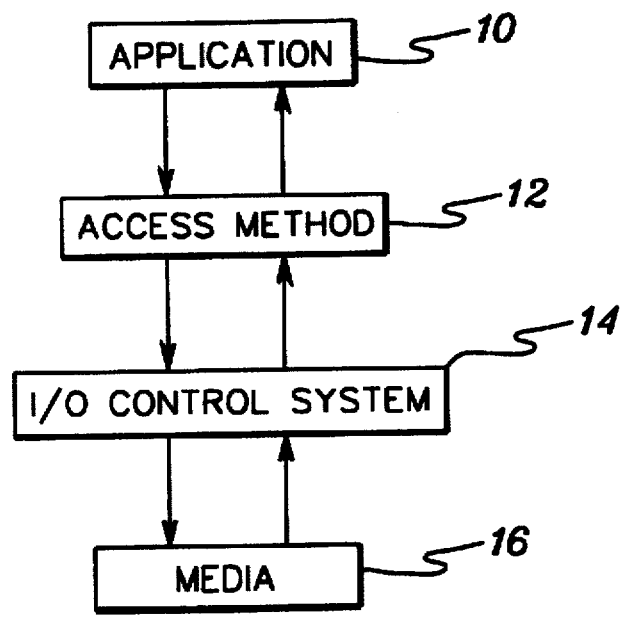
FIG. 1 is a block diagram of fundamental elements in a data processing system useful with the present invention.

As used herein, the term "access method" refers to one or more routines for handling the transfer of data between applications or source/sink adapters (subsequently defined) and the I/O (Input/Output) control system. "Applications" include "jobs", which are merely applications with a narrow purpose. The term "I/O control system" refers to one or more routines for handling the transfer of data between access methods and media (i.e., storage devices). The term "adapter" refers to a function invoked from an access method or the I/O control system for the purpose of acting on data outside an application, for example, selecting, rejecting, formatting, altering, truncating, counting, performing computations, copying, routing, data base updates, merging data, hardening data or performing user-defined operations. "Hardening" data is a process by which data, after being processed by an application or flowing into a pipe, is written to real physical media, for example, tape or DASD (Direct Access Storage Devices). Where an adapter is in the path of the data flow to the media that the application targeted for I/O, data is passed to the adapter by the I/O control system or an access method, acted on by the adapter, and the acted-on data may be returned to the sender and/or a return code and/or a status indicator may be returned to the sender. A "return code" is a value that has meaning to the I/O control system, and causes the I/O control system to take some action. A return code is part of the interface protocol between the I/O control system and an adapter. A "status indicator" is a bit setting indicating the state of a request. A "source-sink adapter" is a special adapter situated between the I/O control system and a data source or sink. In these cases, the adapter redirects data to a sink or obtains data from a source that is different form the media the application targeted for I/O. A source/sink adapter either does not return data directly to the I/O control system, or does not receive data directly from the I/O control system.

As used herein, the term "pipe" refers to a first in, first out (FIFO) temporary storage buffer. The term "pipeline" refers to one or more pipes with one or more reader/writer pairs connected thereto. A "reader" is an application that reads data from a pipe. A "writer" is an application that writes data to a pipe. A writer/pipe/reader configuration represents a basic pipeline. The term "pipe fitting" refers to an I/O adapter used specifically with piping as the media provided by an I/O control system. Logically, a pipe fitting exists outside a pipe in a pipeline. A "pipe fitting" is a special adapter that, as requested, returns records to the I/O control system, which writes data to the specified media (i.e., a pipe). Finally, as used herein, the term "half-pipe fitting" refers to a pipe fitting for which there is no partner connection writing to or reading from a pipe for which the pipe fitting is defined. In other words, a half-pipe fitting is a pipe fitting defined for a "half-pipe", which is a pipe having only a writer or a reader associated therewith. A half-pipe is defined within a program like a pipe, but may or may not have data flowing therethrough. A half-pipe fitting is a special instance of a source/sink adapter. The term "adapter" includes source/sink adapters, I/O adapters, pipe fittings and half-pipes.

As used herein, the term "data source" refers to a functional unit that originates data. Similarly, "data sink" refers to a functional unit that accepts data. A "functional unit" may be hardware or software. Examples of hardware functional units include attached processors, local memory, network nodes, processors, printers, shared distributed memory, storage peripherals, terminal/consoles, and workstations. Examples of software functional units include pipe specifications, data base applications, different file systems (a file system is an operating system component handling the management of information stored on secondary storage), LAN (local area network) servers, message and queuing interfaces (means to send work, in the form of messages, to a server or set of servers, and to retrieve that work from a queue by an available server), object oriented events, parallel transaction servers, program calls, remote procedure calls, and socket interfaces (network I/O interface not bound to any specific destination address unless requested by an application).

One example of the basic elements associated with a data processing system useful with the present invention is depicted in FIG. 1. As shown in FIG. 1, an application 10 uses access method 12 to interface with an I/O control system 14, which will interface directly to any of the storage media 16 present in the system.

In general, application 10 contains macros that are provided by an operating system (not shown) to interface with operating system services. One of those services is access method 12, which is used to provide a unified and simple means for programmers to access data. An access method provides a means to, for example, bind an application and data location, perform buffering on behalf of an application, perform I/O operations, provide synchronization with an application and I/O operations, and/or clean up and unbind an application and data. Access method 12 interfaces with the I/O control system 14, which is part of the operating system kernel that interfaces directly to the media device hardware. As one skilled in the art will know, a "kernel" is operating system code that interfaces directly with the hardware, is intensively used, and is sometimes referred to as a "core" or "nucleus". I/O control system 14 generally uses hardware architected interfaces. I/O control systems provide a means to, for example, construct hardware I/O programs such as channel programs, fix virtual buffers to enable direct memory transfer, select an available I/O path, queue I/O requests for a device, retry I/O requests in busy and error situations, and notify access method 12 of the completions and status of I/O requests. Media 16 may be any of the storage devices available on the system, which may include, for example, tapes, DASD, other processors, outboard memories, and telecommunication lines. One example of an I/O control system useful with the present invention is known as BatchPipes™ by IBM, the manual for which, entitled "BatchPipes/MVS", 1994, is herein incorporated by reference in its entirety.

Figure 2:
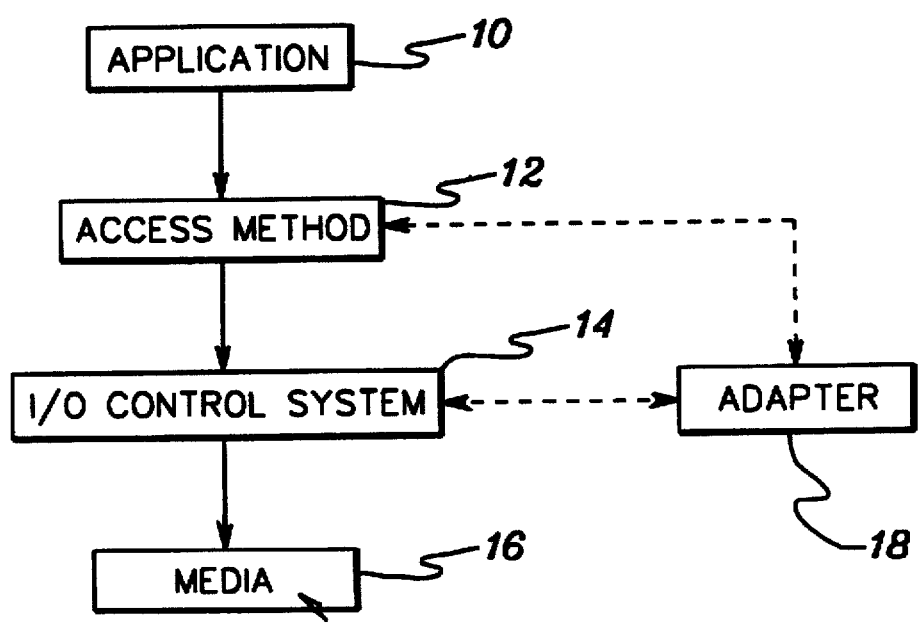
FIG. 2 is a block diagram of the data processing elements of FIG. 1 and an adapter in a write path, according to the present invention.

FIG. 2 depicts the elements of FIG. 1 in a write path with an adapter 18 added according to the present invention. Application 10 uses access method 12 to interface with the I/O control system 14 for the purpose of writing to media 16. Either access method 12 or I/O control system 14 will pass data to adapter 18 prior to moving any data to storage media 16 that was specified by application 10. Whether the access method or I/O control system provide the interface to and/or from an adapter is generally determined by the operating system developer, the determination being based on the structure of the operating system. The adapter will act on the data passed by either access method 12 or I/O control system 14. The access method and I/O control system have no knowledge of the function in adapter 18. Data and/or a return code and/or a status indicator may be returned from the adapter to the entity that passed data thereto, and any data returned may or may not be written to media 16, and any data that is returned may or may not be part or all of the data that was passed to the adapter.

Figure 3:
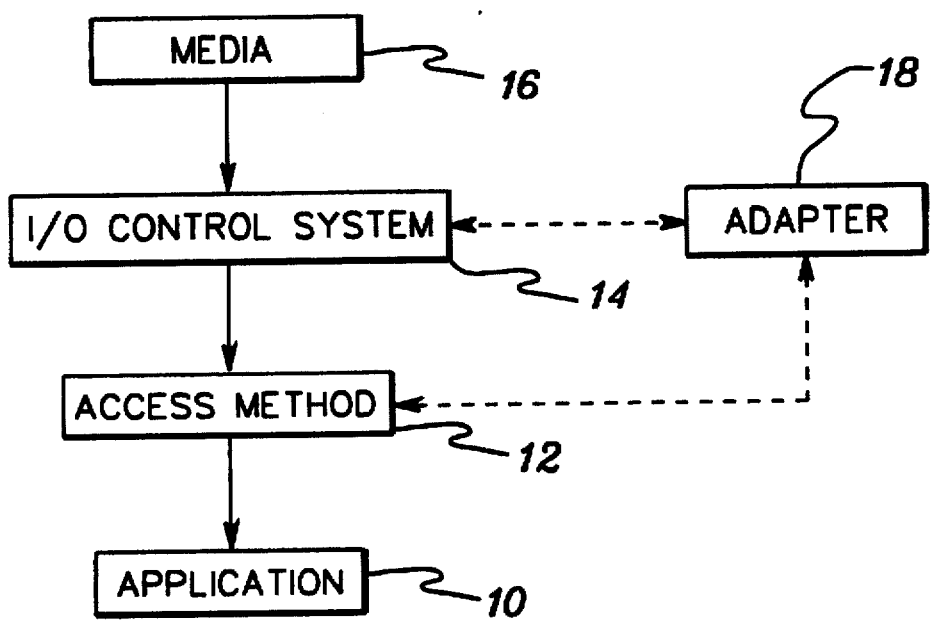
FIG. 3 is a block diagram of the data processing elements of FIG. 1 and an adapter in a read path, according to the present invention.

Adapters can be placed in a write path, as exemplified in FIG. 2, or in a read path, as shown in FIG. 3. Similar to FIG. 2, application 10 uses access method 12 to interface with I/O control system 14 for the purpose of reading from media 16. Either access method 12 or the I/O control system 14 will pass data to adapter 18 from specified storage media 16 prior to sending any data on to application 10. As with the write path, any data returned to application 10 may or may not be the data read from media 16, depending on what takes place in adapter 18.

In general, adapters execute under the system resources owned by or assigned to the application to which the adapter corresponds. However, an adapter may also use other resources not owned by the corresponding application. An application may own resources including, for example, address space, data sets, access authorizations, resource serializations, and memory. Additional resources used by an adapter and not owned by an application may include, for example, CPU access, virtual storage and other resources called by the adapter. An adapter is said to be "transparent" to the corresponding application; meaning that the application is completely unaware of the existence or operation of an adapter. In other words, the application contains no calls or other references to the adapter. An adapter has an internal operating system interface with access methods and I/O control systems, whereas an application has an external interface provided by the operating system.

Figure 4:
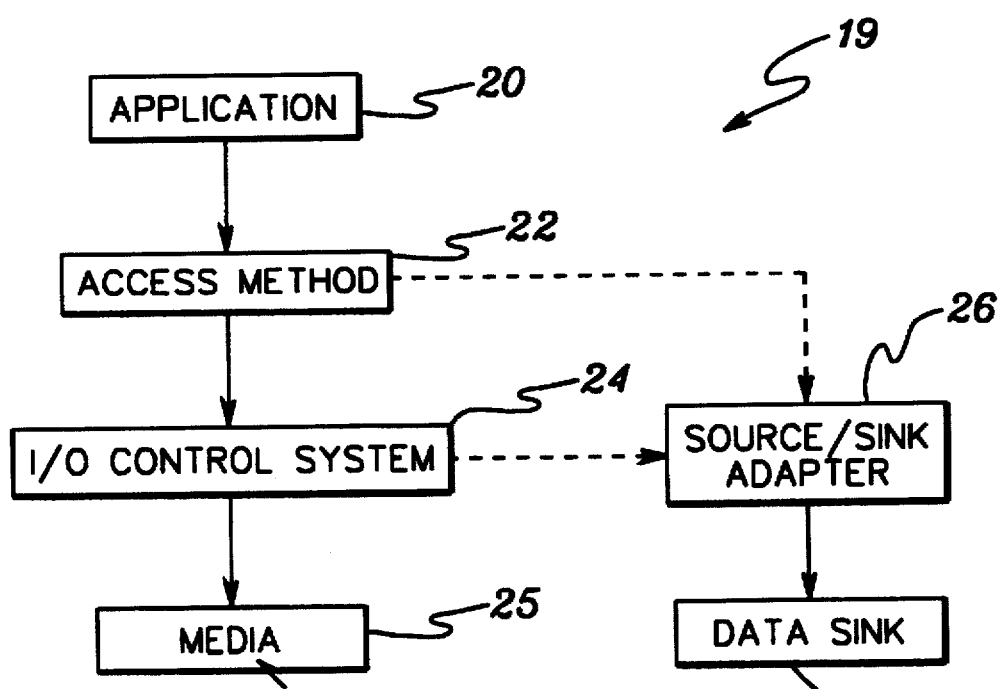
FIG. 4 is a block diagram of the data processing elements of FIG. 1 and a source/sink adapter for a data sink in a write path, according to the present invention.

FIG. 4 is a block diagram of a source/sink adapter according to the present invention and system elements in a write path 19. The direction of main read path 19 shows the intended data flow from the point of view of application 20. An application 20 writes data using an access method 22 to I/O control system 24 destined for specified media 25. Application 20 passes data to access method 22, which would normally pass the data to I/O control system 24, one of which passes the data to a source/sink adapter 26, rather than the normal path. The source/sink adapter transfers data to a data sink 28 specified in the source/sink adapter and does not return a record to the entity which passed data thereto.

Where a particular data source/sink is not a storage device, a programming interface (e.g., a program call) may be used as the interface to an adapter, instead of an access method or the I/O control system. For example, if the data source/sink is a program, a programming interface would be used. As another example, if the data source/sink is a telecommunications line, then a telecommunication access method would be used.

Figure 5:
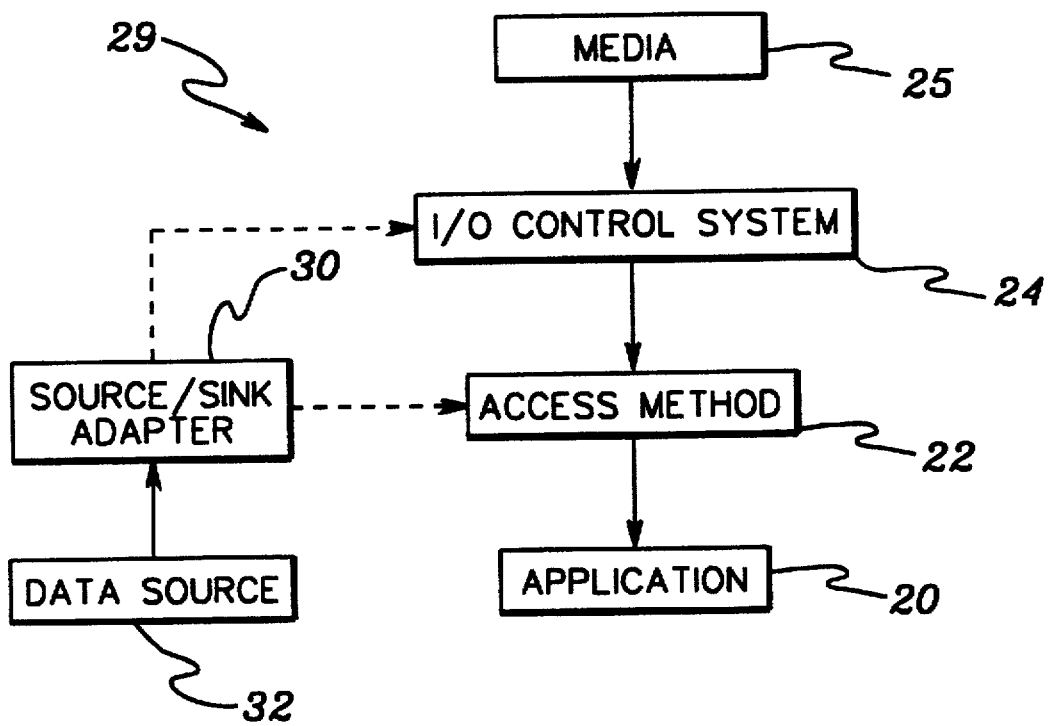
FIG. 5 is a block diagram of the data processing elements of FIG. 1 and a source/sink adapter for a data source in a read path, according to the present invention.

Source/sink adapters can be placed in a write path, as exemplified in FIG. 4, or in a read path 29 as shown in FIG. 5. The direction of main write path 29 shows the intended data flow from the point of view of application 20. Similar to FIG. 4., application 20 uses access method 22 to interface with I/O control system 24, which normally would pass data from media 25. Instead, either the access method 22 or I/O control system 24 will obtain data from source/sink adapter 30. The source/sink adapter reads data from a data source 32. The actual course of events begins with application 20 issuing a read request to access method 22 for data from specified media 25. The access method either sends the read request on to I/O control system 24 or to source/sink adapter 30. Instead of accessing the specified media, if the read request was sent from access method 22, I/O control system 24 sends the read request on to source/sink adapter 30, which then transfers data from the data source 32 to the source/sink adapter 30. Data is then passed to the caller from the source/sink adapter. The caller then passes data on to application 20, following path 29.

As specified in the present invention, the I/O adapter and source/sink adapter processes are invoked from the I/O control system. Preferably, the I/O and source/sink adapters operate under the resources defined and allocated for the application by the operating system. However, circumstances may require these adapters to be invoked by the access method to allow them to run under application-defined resources.

Figure 6:
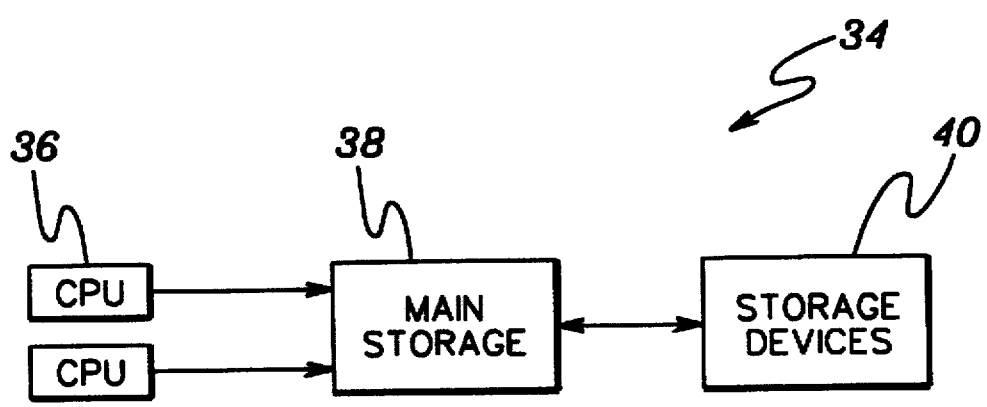
FIG. 6 depicts physical elements of an exemplary computer system useful with the present invention.

One example of the hardware components associated with a method and system for data processing in accordance with the principles of the present invention is depicted in FIG. 6. As shown in FIG. 6, system 34 includes, for instance, one or more central processing units (CPUs) 36, a main storage 38 and one or more storage devices 40. In general, central processing unit(s) 36 contain the sequencing and processing facilities for instruction execution, interruption action, timing functions, initial program loading and other machine-related functions. Central processing unit(s) 36 are coupled to main storage 38, which is directly addressable and provides for high-speed processing of data by the CPUs. Main storage 38 may be either physically integrated with the CPUs or constructed in stand-alone units. Main storage 38 is also coupled to storage devices 40. Data is transferred from main storage 38 to storage devices 40 and from the storage devices back to main storage. One example of an operating system useful with the present invention is IBM Enterprise Systems Architecture (ESA) ESA/Multiple Virtual Storage (MVS) 4.2.0 or higher. One example of a computer system useful with the present invention is an IBM ES/9000 Model 982 running IBM ESA/MVS 4.2.0 operating system or higher.

The present invention will now be described with respect to an exemplary situation. However, it will be understood that this is merely one example of many different situations in which the present invention will be useful. Assume that Company X runs a billing process on a monthly basis. The overall billing process contains two applications. The first application, named "RATER", has as input data that indicates the services used by customers of Company X and calculates the charges to the customers. These charges are then passed to another application, named "BILLER", which formats the bills for printing.

Figure 7:
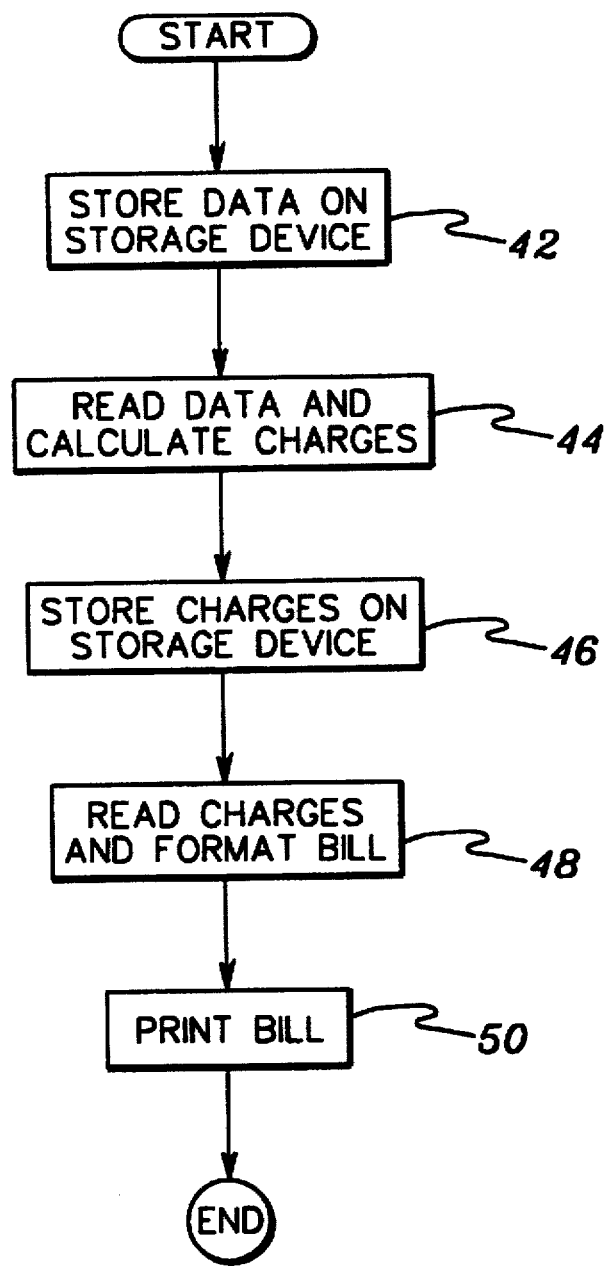
FIG. 7 is a flow diagram for the operation of an exemplary process without employing pipelining.

FIG. 7 depicts one example of the flow associated with the billing process of Company X without employing a piping capability. The data indicating services used by a customer is originally stored on a storage device (STEP 42, "STORE DATA ON STORAGE DEVICE"). As used herein, the term "storage device" refers to any storage media, for example, tape, DASD, optical storage devices, etc. The data is then read and processed by RATER to determine the charges (STEP 44, "READ DATA AND CALCULATE CHARGES"). After the charges to the customers are calculated, RATER opens another file and the charges are passed to it for reading by the BILLER application (STEP 46, "STORE CHARGES ON STORAGE DEVICE"). Once the file (written out in STEP 46) is closed by RATER, the BILLER application can begin execution. The BILLER application reopens the file, reads the calculated charges in the file, and formats the charges into a bill (STEP 48, "READ CHARGES AND FORMAT BILL"). After formatting the calculated charges, the BILLER application closes the file and outputs the formatted charges to the data output stream for subsequent printing by a printer (STEP 50, "PRINT BILL").

A basic job control language (JCL) program for accomplishing the data flow described with respect to FIG. 7 might resemble the following:

```
1.//RATES    JOB
2.//CALC     EXEC PGM=RATER
3.//INPUT    DD DSN=CUSTOMER.USAGE,DISP=OLD
4.//OUTPUT   DD DSN=BILLING.DATA,
5.//         DISP=(NEW,CATLG),UNIT=TAPE,VOL=SER=TEMP,
6.//         LRECL=120,BLKSIZE=32760,RECFM=FB
7.//BILLER   JOB
8.//STMT     EXEC PGM=BILLER
9.//INPUT    DD DSN=BILLING.DATA,
10.//        DISP=OLD,
11.//        LRECL=120,BLKSIZE=32760,RECFM=FB
12.//OUTPUT  DD SYSOUT=*
```

The first line of the program indicates to the operating system the name of the job. The second line of the program is a job step named "CALC", and initiates execution of the RATER application. In the third line of the program, the "customer.usage" file is defined, which serves as the input data to the RATER application. After reading the contents of the customer.usage file, RATER closes it. In the fourth line of the program, the file "billing.data" is defined, which serves as the output file for the RATER application. The billing.data file will exist on a storage medium, such as tape. The fifth line of the program defines the disposition (DISP) of the data as NEW for this invocation and is meant to be kept and registered in a catalog for later use. The media to be used for the data output is defined as a tape (UNIT= TAPE) and the tape volume is defined as a standard label tape with a volume serial of TEMP (VOL=SER=TEMP). The sixth line of the program provides the characteristics of the output data set: "LRECL" referring to a logical record length; "BLKSIZE" referring to the size of a block of records to be transferred and "RECFM" referring to the record format, in this case the records are a fixed length and are blocked. The seventh line of the program indicates the start of the BILLER application or job, with the eighth line being a job step initiating execution of the BILLER application. On the ninth line of the program, the billing.data file is defined, which is opened by the program for input. The tenth line of the program indicates that the billing.data file is an already existing file (OLD) and to retain the file when BILLER ends. Lines 5 and 10 are used to define the media, the processing disposition, and the location of billing.data. The eleventh line of the program indicates the characteristics of the data. After formatting the data, the BILLER application closes the billing.data file, and the twelfth line of the program defines the target for the output stream for printing.

Figure 8:
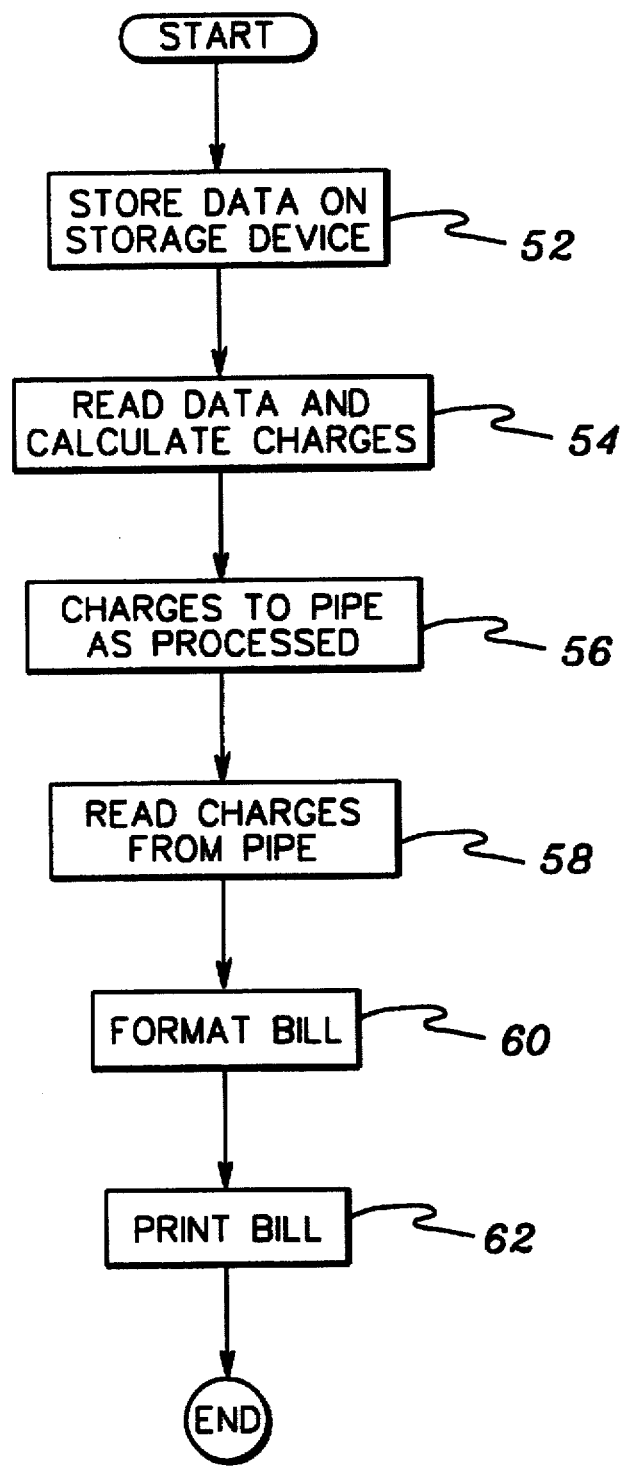
FIG. 8 is a flow diagram for the process of FIG. 7 employing pipelining.

FIG. 8 depicts one example of the flow associated with the billing process of Company X employing a piping capability for enabling data flow parallelism. One example of an I/O control system which provides a piping capability is known as BatchPipes™, the manual for which, entitled "IBM BatchPipes/MVS," is herein incorporated by reference in its entirety. Initially, as with FIG. 7, the data indicating services used is at some point stored on a storage device (STEP 52, "STORE DATA ON STORAGE DEVICE"). The RATER application then opens the file containing the services-used data, reads, the data and calculates the charges (STEP 54, "READ DATA AND CALCULATE CHARGES"). As RATER is processing the data, it is transferred into a pipe for reading by the BILLER application (STEP 56, "CHARGES TO PIPE AS PROCESSED"). Concurrent with the RATER application processing the data and placing it in the pipe, the BILLER application reads the charges placed in the pipe (STEP 58, "READ CHARGES FROM PIPE) and formats the charges for printing (STEP 60, "FORMAT BILL"). After formatting the piped data, the BILLER application sends the formatted data into the output stream for subsequent printing (STEP 62, "PRINT BILL").

An exemplary JCL implementation of the flow diagram of FIG. 8 is given below:

```
1.//RATES    JOB
2.//CALC     EXEC PGM=RATER
3.//INPUT    DD DSN=CUSTOMER.USAGE,DISP=OLD
4.//OUTPUT   DD DSN=BILLING.DATA,
5.//         SUBSYS=BP01,
6.//         LRECL=120,BLKSIZE=32760,RECFM=FB
7.//BILLER   JOB
8.//STMT     EXEC PGM=BILLER
9.//INPUT    DD DSN=BILLING.DATA,
10.//        SUBSYS=BP01,
11.//        LRECL=120,BLKSIZE=32760,RECFM=FB
12.//OUTPUT  DD SYSOUT=*
```

The exemplary JCL program for the Company X billing process of FIG. 8 is similar to that for FIG. 7, except for the "SUBSYS" lines (lines five and ten), which invoke the BatchPipes™ I/O control system, turning over data transfer control thereto. This defines the media as being a pipe in this case, similar to lines five and ten in the previous exemplary JCL program defining real media for the file. The BatchPipes™ I/O control system allows the RATER application to process the data and place it in a pipe, while the BILLER application concurrently reads the data from the pipe and formats it. Thus, the BatchPipes™ I/O control system provides a pipeline allowing the RATER and BILLER applications to execute concurrently, significantly reducing the time needed to perform the Company X billing process.

Figure 9:
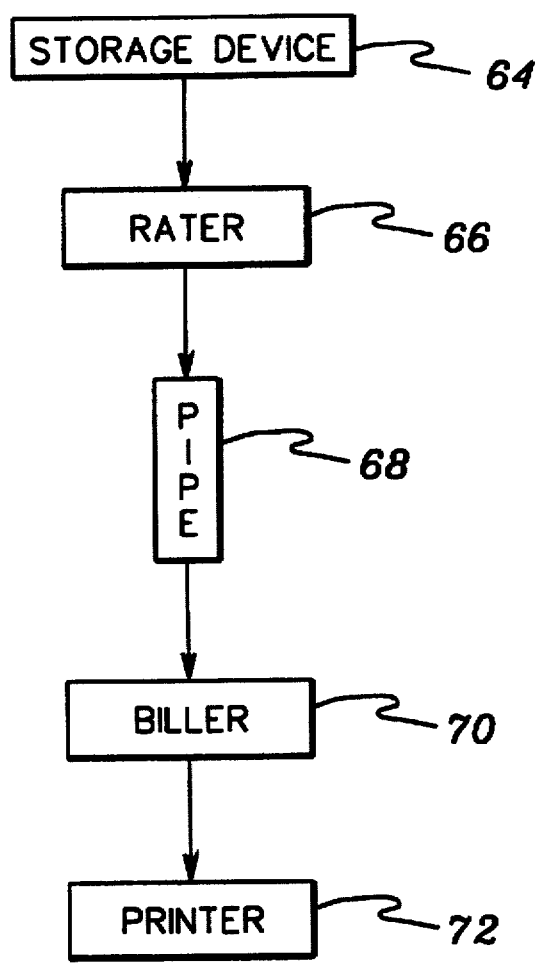
FIG. 9 is a topology diagram showing data flow between elements in an exemplary implementation of the flow diagram of FIG. 8.

FIG. 9 is a topology diagram showing data flow between elements in an exemplary implementation of the flow diagram of FIG. 8. It will be understood that, although not specifically described with respect to this figure and subsequent similar figures, the applications, media, I/O adapters, source/sink adapters and data source/sinks communicate as described with respect to FIGS. 1–5. The following description and the description of subsequent topology diagrams are simplified for ease of discussion. The data indicating services used is accessed from a storage device 64 by the RATER application 66, which then processes the data (i.e., calculates charges) and writes the charges to a pipe 68 as the charges are calculated. Pipe 68 is the only pipe in use between the RATER 66 and BILLER 70 applications. The BILLER application 70 reads the charges from pipe 68 as they are available, formats the charges into a bill and writes the output to a printer 72.

Recall that in the description of the exemplary JCL implementation of FIG. 7, the output of RATER was stored in the billing.data file and retained. Assume now that Company X requires a hard copy of billing.data for auditing purposes. As one skilled in the art would know, piped data is transient and is not conventionally written to real media. Assuming Company X desires to retain the elapsed time improvements from piping, but does not want to modify either the RATER or BILLER applications to write an additional copy of billing.data, one conventional solution is to add a job to the pipeline to make a copy of the data file. This job would have to read data from the output pipe of RATER, then write a copy of the data file to both a designated storage media and the input pipe to BILLER.

Figure 10:
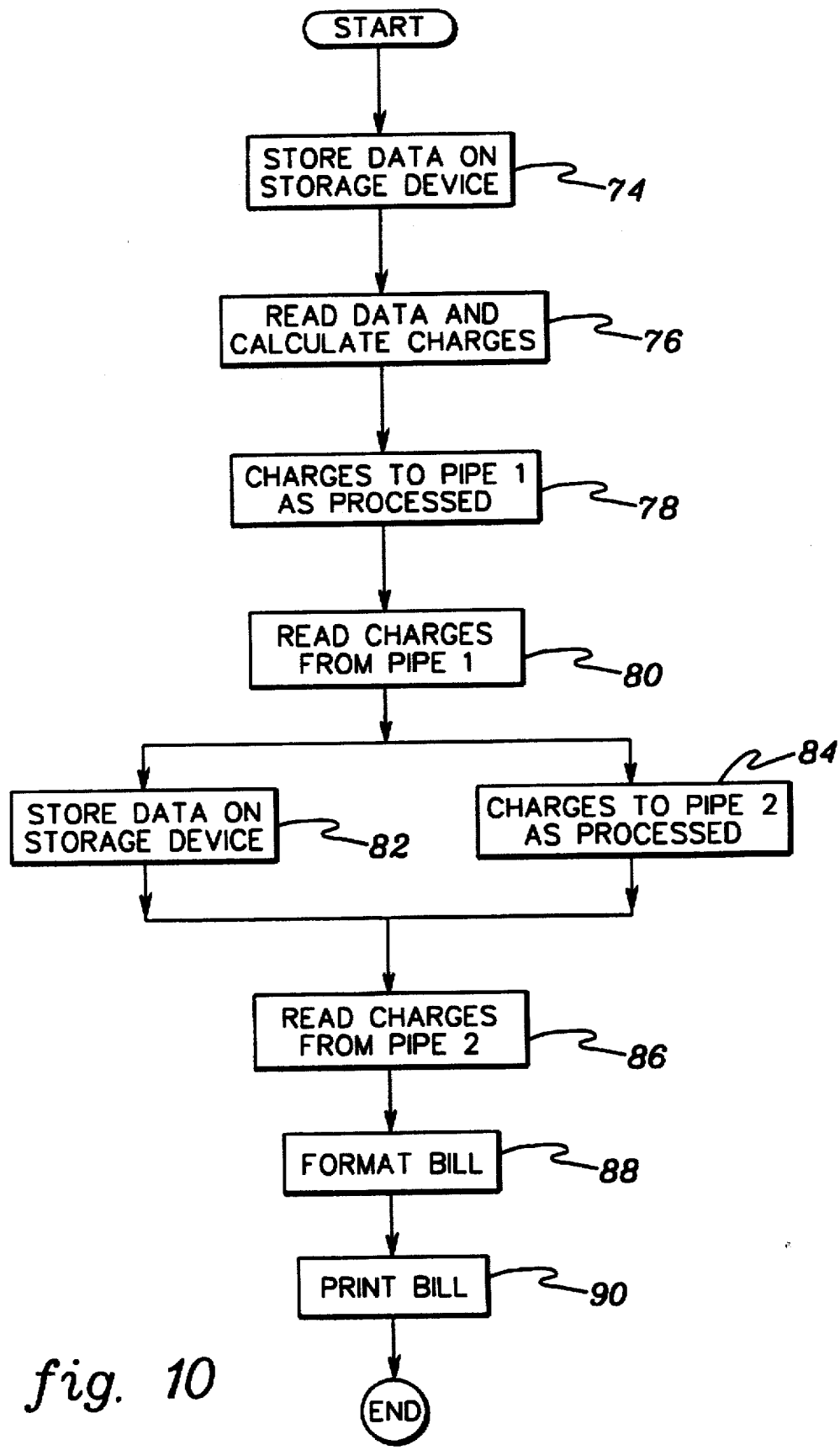
FIG. 10 is a flow diagram for the process of FIG. 8 with an added job for hardening the data.

FIG. 10 is a flow diagram of one example of the Company X billing process with an added job named "COPIER" to harden the output of the BILLING application. Initially, as with FIG. 8, the data indicating services used is stored on a storage device (STEP 74, "STORE DATA ON STORAGE DEVICE"). The RATER application causes the file containing the data to be opened, reads the data and calculates the charges (STEP 76, "READ DATA AND CALCULATE CHARGES"). As RATER is calculating the charges, they are transferred into a pipe for reading by the COPIER application (STEP 78, "CHARGES TO PIPE 1 AS PROCESSED"). Concurrent with the RATER application processing the data and placing it in the pipe, the COPIER job reads the data from pipe 1 (STEP 80, "READ CHARGES FROM PIPE 1") and writes the data to physical media (STEP 82, "STORE DATA ON STORAGE DEVICE), as well as writing the data to a second pipe (STEP 84, "CHARGES TO PIPE 2 AS PROCESSED"). The BILLER application reads the data placed in the second pipe (STEP 86, "READ CHARGES FROM PIPE 2") and formats it (STEP 88, "FORMAT BILL"). After formatting the piped charges, the BILLER application sends the formatted data into the output stream for subsequent printing by a printer (STEP 90, "PRINT BILL"). An exemplary JCL implementation of the flow diagram of FIG. 10 is given below:

```
1.//RATES    JOB
2.//CALC     EXEC PGM=RATER
3.//INPUT    DD DSN=CUSTOMER.USAGE,DISP=OLD
4.//OUTPUT   DD DSN=BILLING.DATA,
5.//         SUBSYS=BP01,
6.//         LRECL=120,BLKSIZE=32760,RECFM=FB
7.//COPIER   JOB
8.//COPY     EXEC PGM=COPIER
9.//INPUT    DD DSN=BILLING.DATA,
10.//        SUBSYS=BP01,
11.//        LRECL=120,BLKSIZE=32760,RECFM=FB
12.//HARDEN  DD DSN=BILLING.DATA,
13.//        DISP=(NEW,CATLG),UNIT=TAPE,VOL=SER=SAVEIT,
14.//        LRECL=120,BLKSIZE=32760,RECFM=FB
15.//OUTPUT  DD DSN=BILLING.DATA2,
16.//        SUBSYS=BP01,
17.//        LRECL=120,BLKSIZE=32760,RECFM=FB
18.//BILLER  JOB
19.//STMT    EXEC PGM=BILLER
20.//INPUT   DD DSN=BILLING.DATA2,
21.//        SUBSYS=BP01,
22.//        LRECL=120,BLKSIZE=32760,RECFM=FB
23.//OUTPUT  DD SYSOUT=*
```

The exemplary JCL program for the Company X billing process of FIG. 10 is similar to that for the process without piping, except for the addition of a COPIER job in the program (lines 7–17), and the addition of a "billing.data2" pipe. Thus, for a detailed description of lines 1–6 and 18–23 of the JCL program, see the description of the JCL program associated with FIG. 8.

Line seven of the above JCL program indicates to the operating system the name of the copy job. The eighth line of the program is a job step named "COPY", and initiates execution of the COPIER job. In lines 9–11 of the program, the "billing.data" file is defined as a pipe for "billing.data" to be received from the RATER application. The COPIER job will read records from the pipe and write each record to the tape file defined in lines 12–14. The name of the file will be billing.data and this file will reside on a tape with the volume serial of "SAVEIT". The file is a new file and its physical location will be kept in a catalog. Each record/block that the COPIER job writes to the tape will also be written to the output pipe to BILLER. The output pipe is defined in lines 15–17 of the program. The name of the pipe can no longer be billing.data, otherwise BILLER would read from the output pipe of RATER and only read a portion of that data, since that is a shared pipe with the COPIER program. Thus, the name of the input pipe for BILLER must be changed; in line 15 the name is specified as "billing.data2". The content of the pipe is a copy of the billing.data file. This requires a change to the control language for the BILLER program to read from the output file of COPIER, so line 20 in the program refers to an input pipe for BILLER with the name of "billing.data2".

Figure 11:
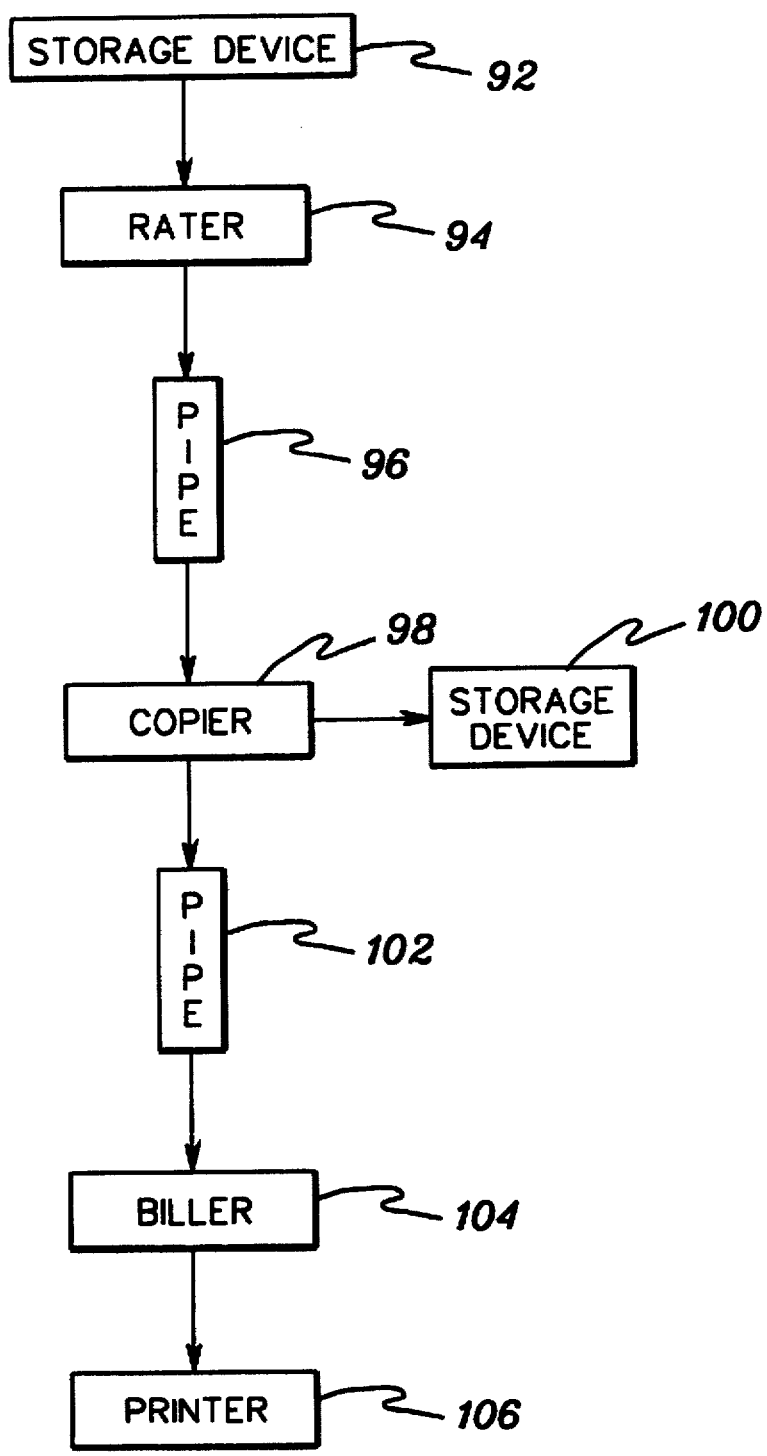
FIG. 11 is a topology diagram showing data flow between elements in an exemplary implementation of the flow diagram of FIG. 10.

In order to get the benefit from piping and to meet the requirements of the existing application process, an additional job, initiator, storage, pipe and connections are conventionally used to solve this problem. FIG. 11 is a topology diagram showing the extra resources used as compared to the topology diagram of FIG. 9 (without the COPIER job). The data indicating services used is accessed from a storage device 92. The RATER application 94 processes the data and writes calculated charges to a pipe 96 as the records are processed. The COPIER job 98 reads the charges accessed from pipe 96, writes the charges to a storage device 100 to harden it, and also writes the charges to a second pipe 102 for reading by the BILLER application 104. The BILLER application reads the charges from pipe 102, formats the bill and writes the output to the data output stream for printing by a printer 106. In order to maximize the parallelism for this processing, at least three CPUs would be used, one each for RATER, BILLER and COPIER.

As can be appreciated from FIG. 11, the addition of the COPIER job consumes resources over the original billing process implemented with a basic I/O control system. Specifically, an additional pipe and two connections therefor were added. A connection is a job/pipe association when a job invokes an OPEN for a data set that is defined to be handled as a pipe by the I/O control system. An OPEN is an access method service that binds an application to a data set. Also, another initiator was used for the COPIER job. As one skilled in the art will know, an "initiator" is a task or process that starts the execution of an application or job. In addition, there is additional overhead required for piping the data, and path length and data movement and/or data management costs are incurred. Further, the introduction of another application (i.e., "address space") results in additional contention for resources. If swapping is enabled, the COPIER job represents an additional candidate which could be swapped out and thereby diminish the effectiveness of the concurrent execution inherent in the pipeline. As one skilled in the art will know, the term "swapped out" refers to causing a process to relinquish storage and CPU access for other work for a period of time.

Figure 12:
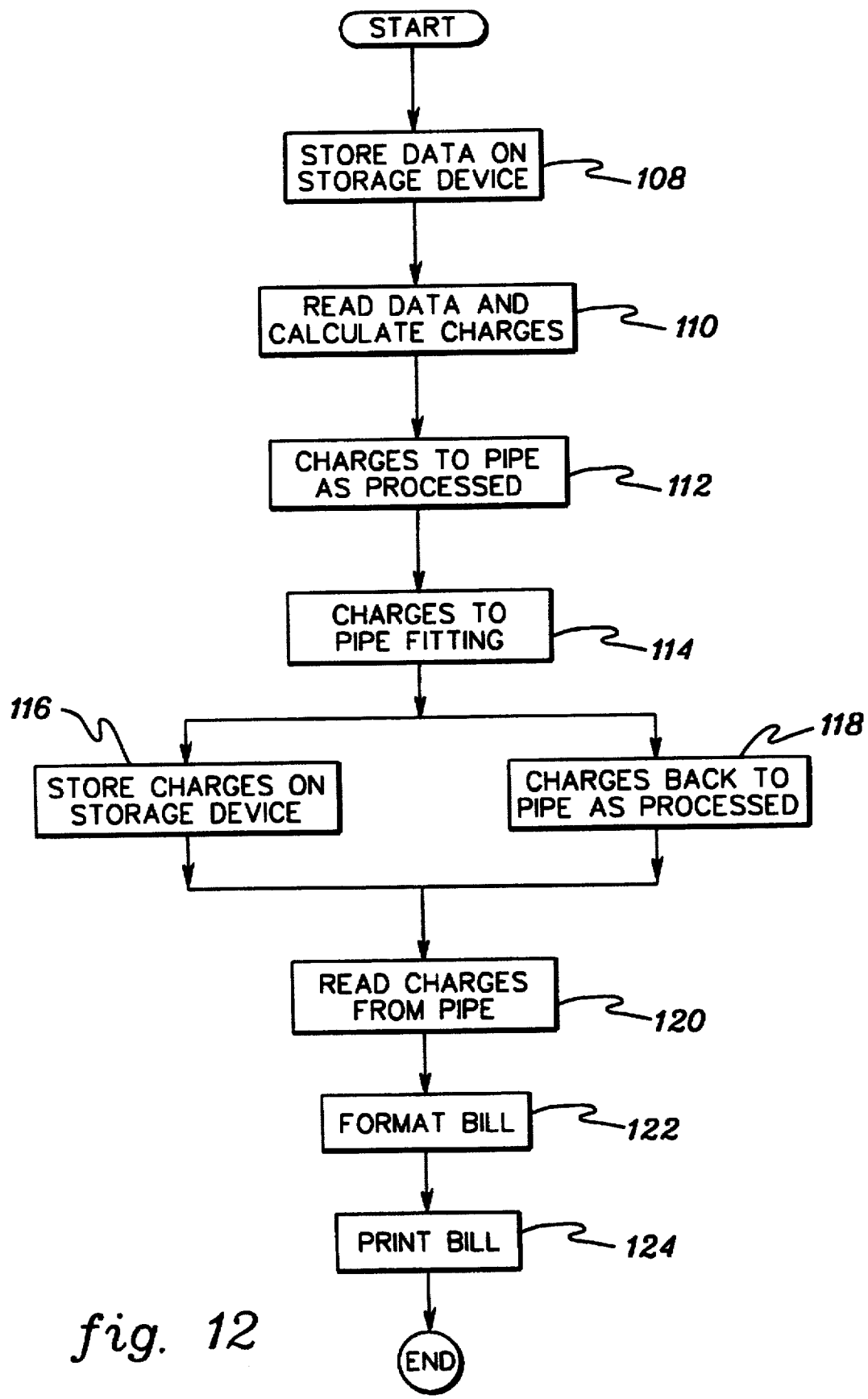
FIG. 12 is a flow diagram for the process of FIG. 10 with an added adapter for hardening the data instead of the added job.

To minimize the resources required to harden the data after, for example, processing by the RATER application, a pipe fitting according to the present invention is implemented. FIG. 12 depicts the flow associated with the Company X billing process implemented with an exemplary data hardening pipe fitting according to the present invention. Initially, as with FIG. 10, the data indicating services used is stored on a storage device (STEP 108, "STORE DATA ON STORAGE DEVICE"). The RATER application then opens the file containing the data, reads the data and calculates the charges (STEP 110, "READ DATA AND CALCULATE CHARGES"). As RATER is processing the data, it is transferred into a pipe for reading by the BILLER application (STEP 112, "CHARGES TO PIPE AS PROCESSED"). The output of RATER is passed from the pipe to a pipe fitting by the I/O control system (STEP 114, "CHARGES TO PIPE FITTING"). The pipe fitting hardens the data and returns it to the I/O control system for piping and reading by the BILLER application (STEP 116, "STORE CHARGES ON STORAGE DEVICE"; and STEP 118, "CHARGES BACK TO PIPE AS PROCESSED"). The I/O Control System has no awareness of the function of the pipe fitting. In this instance, the pipe fitting will write the record received to storage media (STEP 116) and the same record will be returned to the I/O control system by the pipe fitting for writing back to the pipe (STEP Concurrent with the RATER application processing the data and placing it in the pipe, and the pipe fitting hardening the data, the BILLER application reads the data placed back in the pipe by the I/O control system (STEP 120, "READ CHARGES FROM PIPE") and then formats the data for printing (STEP "FORMAT BILL"). After formatting the piped data, the BILLER application sends the formatted data into the output stream for subsequent printing (STEP 124, "PRINT BILL").

An exemplary JCL implementation of the flow diagram of FIG. 12 is given below:

```
1.//RATES    JOB
2.//CALC     EXEC PGM=RATER
3.//INPUT    DD DSN=CUSTOMER.USAGE,DISP=OLD
4.//OUTPUT   DD DSN=BILLING.DATA,
5.//         SUBSYS=(BP01,'FIT=BPR | QSAM HARDEN |
             BPW'),
6.//         LRECL=120,BLKSIZE=32760,RECFM=FB
7.//HARDEN   DD DSN=BILLING.DATA,
8.//         DISP=(NEW,CATLG,),UNIT=TAPE,
             VOL=SER= SAVEIT,
9.//         LRECL=120,BLKSIZE=32760,RECFM=FB
10.//BILLER  JOB
11.//STMT    EXEC PGM=BILLER
12.//INPUT   DD DSN=BILLING.DATA,
13.//        SUBSYS=BP01,
14.//        LRECL=120,BLKSIZE=32760,RECFM=FB
15.//OUTPUT  DD SYSOUT=*
```

The I/O control system command on line 5 includes an embedded keyword subparameter (FIT=), which defines the pipe fitting. The pipe fitting includes a reference to a file defined by the statement named "HARDEN", the contents of which will be the output from RATER. Note that the pipename for the input to BILLER (i.e., "billing.data") does not have to change. The pipe fitting is specified entirely, in this case, as a subparameter for the SUBSYSTEM parameter on line 5. The "FIT" designation on line 5 indicates to the I/O control system that a pipe fitting specification follows, which is designated "BPR;QSAM HARDEN;BPW". Line 5 describes the pipe fitting and begins with "BPR", which represents a request to obtain a record from the I/O control system. Once obtained, the record is passed to the next function in the specification. The vertical bar "!" indicates the end of the first function, in this case, "BPR" and the beginning of the next function. The "QSAM HARDEN" portion of line 5 represents a request, for using a queued sequential access method (QSAM) to write a copy of the data to a file defined by a JCL statement labeled "HARDEN", which is specified on lines 7 through 9. If the QSAM stage command is first in the pipeline, the file will be read from; if specified at any other stage, the file will be written to. "BPW" represents a request for a return to the I/O control system with the data and/or a condition code representing action to be taken by the I/O control system.

Figure 13:
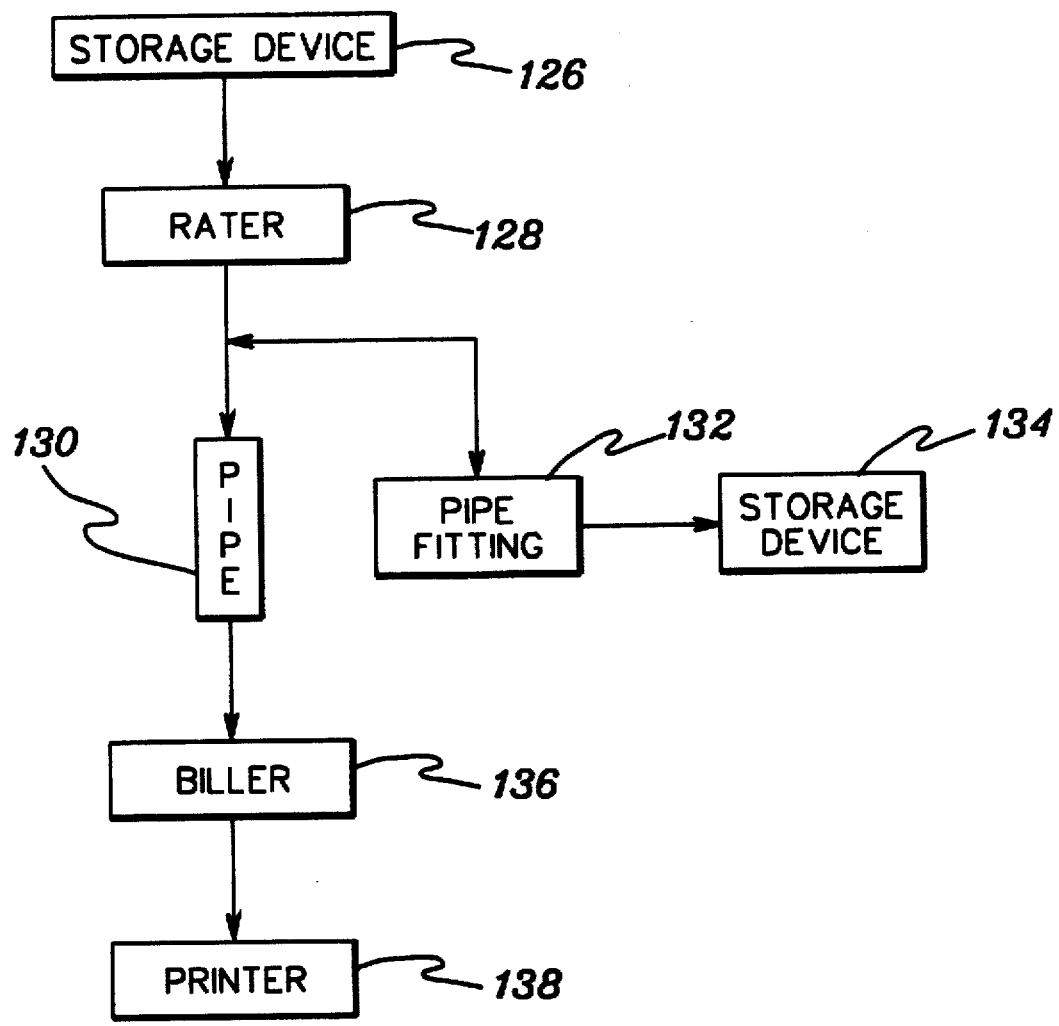
FIG. 13 is a topology diagram showing data flow between elements in an exemplary implementation of the flow diagram of FIG. 12.

FIG. 13 is a topology diagram showing data flow between elements in an exemplary implementation of the flow diagram of FIG. 12. The data is accessed from a storage device 126 by the RATER application 128, which then processes the data and writes to a pipe 130 as the data is processed. However, before the processed data reaches pipe 130, it is routed to a pipe fitting 132. Recall that a pipe fitting is a special instance of an adapter that acts on data before it passes through a pipe. The pipe fitting is passed a pointer to the data and the length of the data. The pipe fitting writes the data to a storage device 134 to contain the hardened data and then returns to the I/O control system indicating the data to be written to the pipe 130 for reading by the BILLER application 136. Pipe fitting 132 is transparent to RATER, and executes under resources owned by RATER, since it is defined under the JCL defining the RATES job. The BILLER application reads the data from the pipe written by the I/O control system, formats the bill and writes the output to the data output stream for printing by a printer 138. As contrasted with FIG. 11, the use of a pipe fitting requires one less pipe, one less dispatchable unit of work, one less storage map (e.g. address space), and one less CPU for maximum parallelism. To maximize parallelism, the pipe fitting would preferably be placed on the connection which consumed the least CPU cycles per record. For maximum parallelism without consuming unnecessary resources, in this case, only two CPUs would preferably be used (i.e., one for RATER and its associated pipe fitting, and one for BILLER).

The present invention significantly reduces the resources consumed in the process of hardening the data by accomplishing the function of the hardening job outside the confines of the applications in the pipeline. The function of the COPIER job is accomplished by a pipe fitting, which is a function that interfaces with an I/O control system for the purpose of acting on data placed in a pipe, for example, selecting, formatting, altering, combining with other data or hardening the data. The pipe fitting is independent of the applications in the pipeline, which allows the applications to remain unchanged, i.e., no coding changes to the applications in the pipeline are needed. Existing applications whose code is not desired to be modified, for example, code critical to the company or data processing site, will be referred to herein as "heritage applications".

Assume now that Company X is hardening data to a special data set known as a generation data group data set. Use of a generation data group assumes there is a requirement to harden the data for auditing purposes. In the previous example, it was noted that a COPIER job is a successful, but resource-excessive means of hardening data. In the use of generation data groups, having an additional job in the pipeline to make a copy of the next level of the piped generation data group would not be a possible solution. Generation data group data sets have a common data set name prefix, but are differentiated by use of an index level as a member name. Level zero is the base data set, level +1 is generated from level zero and so on. If the "billing-.data" file is actually a generation data group and RATER reads level 0 and pipes level 1, seeking to harden level 1, it is not possible to do so by adding an additional stage (i.e., the COPIER job) to the pipeline. The reason for this restriction is that COPIER would request exclusive use of the generation data group common prefix name while RATER would have the resource in shared mode to read the base level. COPIER would be denied the resource, thereby preserving data integrity of the generation data group. This request would result in a deadlock, and RATER and COPIER could not run as part of a pipeline as noted in FIG. 10 for hardening. Conventionally, hardening under these circumstances is only possible by application modification or adding a new and separate process to run after the pipeline, thereby requiring even more resources and time.

The task can, however, be accomplished by implementing a pipe fitting as described in the previous example to harden the data placed in a pipe. The pipe fitting would be executed under the resources allocated by RATER and thus would be assigned exclusive use of the common prefix name of the generation data group. This example is an instance of how the present invention can be used to solve problems in pipeline construction that are introduced by operating system resource serialization requirements.

Assume now that Company X accidentally overcharged another company, the Hal Company, and wishes to locate all the records associated with the Hal Company and rerun the billing process therefor. Assume also that the data relating to the Hal Company resides in columns 12-14 of the data records. Since the basic piping capability only transfers data between applications (or jobs) and/or storage devices, another job would, conventionally, be created to accomplish the selection of the data related to the Hal Company for the re-billing of the Hal Company by Company X.

Figure 14:
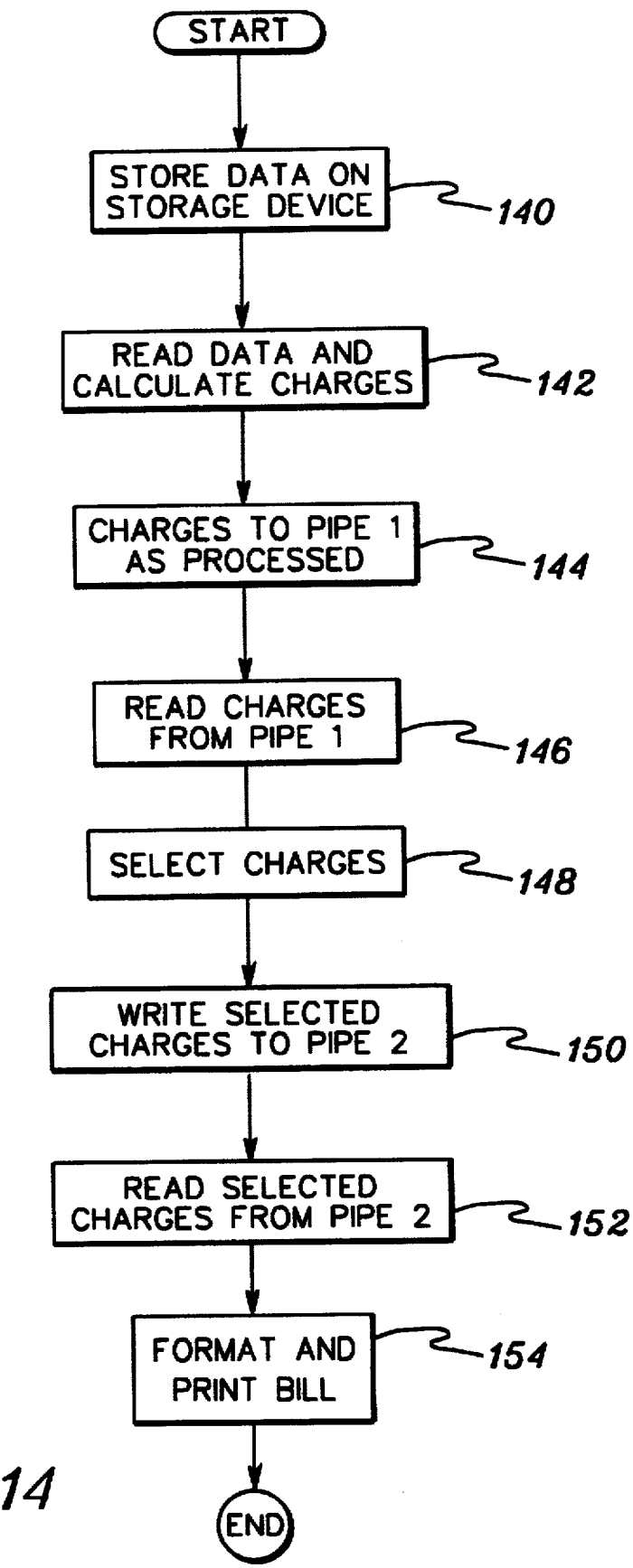
FIG. 14 is a flow diagram for the process of FIG. 8 with an added job to exclude records from the process.

FIG. 14 depicts the flow associated with one example of the re-billing of the Hal Company by adding another job to the billing process. Initially, the data regarding the usage of Company X services is stored on a storage device (STEP 140, "STORE DATA ON STORAGE DEVICE"). The RATER application opens the file containing the data, reads the data and calculates charges (STEP 142, "READ DATA AND CALCULATE CHARGES"). As the RATER application is processing the data, it is transferred to a first pipe for reading by a record selection job named "SELECT" (STEP 144, "CHARGES TO PIPE 1 AS PROCESSED"). Concurrent with STEP 144, the SELECT job reads the output of the RATER application from the pipe (STEP 146, "READ CHARGES FROM PIPE 1") and excludes all records, except those relating to the Hal Company (STEP 148, "SELECT CHARGES"). The SELECT job then writes the Hal Company data to another pipe (STEP 150, "WRITE SELECTED CHARGES TO PIPE 2"). Concurrent with the transferring into the second pipe by the SELECT job, the BILLER application reads the selected data from the second pipe (STEP 152, "READ SELECTED CHARGES FROM PIPE 2"). After reading the data, the BILLER application formats the data and outputs the formatted data to the output stream for subsequent printing by a printer (STEP 154, "FORMAT AND PRINT BILL").

As can be appreciated from FIG. 14, the addition of the SELECT job consumes resources over the billing process implemented with a basic I/O control system. Specifically, an additional pipe and two connections therefor are required. Also, another initiator is required for the SELECT job, and there is additional overhead required for piping the data, and path length and data movement and/or data management costs are incurred. Further, the introduction of another application (i.e., "address space") results in additional contention for resources. If swapping is enabled, the SELECT job represents an additional candidate which could be swapped out and thereby diminish the effectiveness of the concurrent execution inherent in the pipeline. The present invention significantly reduces the resources consumed in the process of rebilling the Hal Company by accomplishing the function of the SELECT job outside the confines of the original pipeline. The function of the SELECT job is accomplished by a pipe fitting. The ability to specify the selection in the pipe fitting enables less data to be piped than if the SELECT job were to be used. It also enables application programs a quick methodology to develop perhaps a single use application without having to use the "compile, assemble and link edit" process necessary for stored library programs in higher level languages, since the data adapters are specified in an interpreted language which goes directly to machine instruction level at the time of execution and only for the path executed. One skilled in the art will understand the "compile, assemble and link edit" process. Preferably, an interpreted language known as "CMS Pipelines" is used, however, other interpreted languages may be used, such as, for example, REXX (Restructured Extended Executor Language) and APL (A Programming Language). Use of the pipe fitting also allows the heritage applications to remain unchanged.

An interpreted language is generally a language for decoding and immediately executing instructions written as pseudo-code. In order to use an interpreted language to define an adapter according to the present invention, an interface between an interpreted language and the particular environment (e.g., CMS, MVS) is needed. A preferred programming interface method allowing the use of an interpreted language to define an adapter, will now be described.

In order to implement a data adapter, the I/O control system or an access method, and data adapter implementation language must be "connected." At device allocation time, the presence of the adapter is flagged in a communication area in memory for the adapter and the operating system components. The communication area could exist, for example, in virtual storage. The adapter specification and/or an indication of its location is also saved in the communication area. At access method data set open time, the indication of adapter presence triggers the invocation of a language parser, and the location of the adapter specification is passed thereto. A language parser reviews a language statement to confirm that it is syntactically and structurally correct for the particular language being used. The language parser is part of that language, and may be housed therewith. The language specification of the adapter is read into memory, and the parser returns an indication of success or failure of language specification recognition. If success is indicated, the parser returns a token representing the instance of the language specification. If failure is indicated, OPEN processing terminates abnormally. When data is available in the I/O control system, the adapter begins to execute on the first instance of data presence. Subsequent data availability results in resumption of adapter execution. At access method data set close time, the access method close process must invoke the language routines with an indication that it is the last resumption of adapter execution. The language routines then return an indication of success or failure of the last adapter resumption and completion thereof. If failure is indicated, CLOSE processing terminates abnormally. Extensions to a given interpreted language (i.e., the addition of new language constructs) may or may not be necessary to implement the adapter for a particular operating system. In addition, extensions to the operating system itself may or may not be necessary to implement the adapter.

Figure 15:
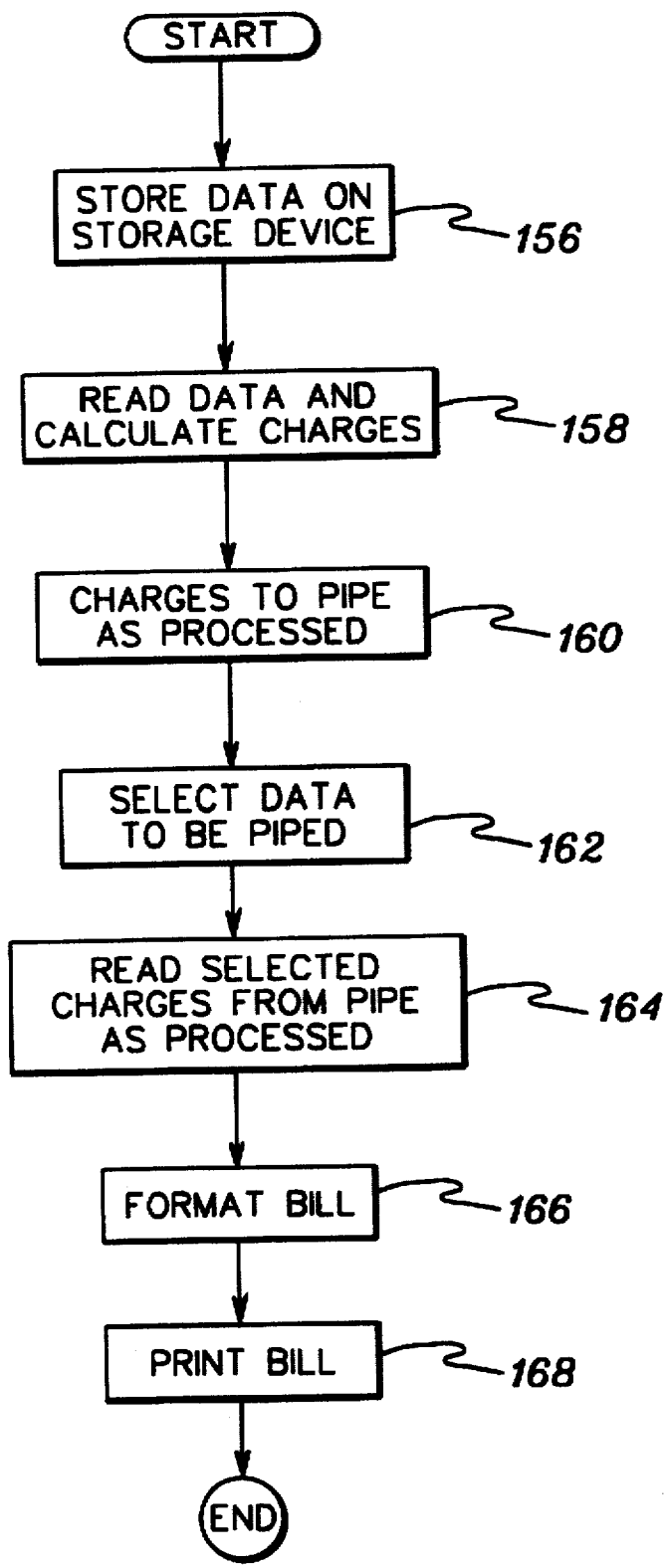
FIG. 15 is a flow diagram for the process of FIG. 14 with an added pipe fitting, instead of the added job, to exclude records.

FIG. 15 is a flow diagram for the Hal Company rebilling process implementing a pipe fitting in accordance with the present invention. Initially, the data indicating services used by customers is stored on a storage device (STEP 156, "STORE DATA ON STORAGE DEVICE"). The RATER application accesses the data and processes it (STEP 158, "READ DATA AND CALCULATE CHARGES"). The RATER application writes charges to the pipe as they are calculated (STEP 160, "CHARGES TO PIPE AS PROCESSED"). A pipe fitting is invoked out of the I/O control system to select the data to be piped for reading by the next stage in the pipeline (STEP 162, "SELECT DATA TO BE PIPED"). The function of the pipe fitting is similar to that performed by the SELECT job described with respect to FIG. 10, however, no additional pipe is needed between the RATER application and the pipe fitting. As the pipe fitting is selecting the Hal Company data from the output of the RATER application, the Hal Company data is passed by the pipe fitting back to the I/O control system for transfer to the pipe and reading by the BILLER application (STEP 164, "READ SELECTED CHARGES FROM PIPE AS PROCESSED"). Concurrently with the pipe fitting passing the Hal Company data to the pipe, the BILLER application reads the Hal Company data from the pipe and formats it (STEP 166, "FORMAT BILL"). After the BILLER application formats the selected charges into a bill, it is sent to the output stream for subsequent printing (STEP 168, "PRINT BILL").

An exemplary JCL implementation of the flow diagram of FIG. 15 is shown below, and replaces the RATES job of the JCL program described with reference to FIG. 13, with the rest being the same.

```
1.//RATES    JOB
2.//CALC     EXEC PGM=RATER
3.//INPUT    DD DSN=CUSTOMER.USAGE,DISP=OLD
4.//OUTPUT   DD DSN=BILLING.DATA,
5.//         SUBSYS=(BP01,'FITDD=FITTING'),
6.//         LRECL=120,BLKSIZE=32760,RECFM=FB
7.//FITTING DD *
8.   BPR ! locate 12-14 /HAL/ ! BPW
```

The operation of the above program portion is similar to that of the RATES job described with respect to FIG. 9, except that the pipe allocation specification on line 5 indicates that the pipe fitting can be found in a file defined on the JCL statement labelled "FITTING". The "FITTING DD *" on line 7 is JCL indicating that the pipe fitting is defined in a file and the contents of the file are specified on line 8 of the JCL program. Line 8 describes the pipe fitting and begins with "BPR". BPR represents a request to obtain a record from the I/O control system. The data obtained is passed to the next function which is the "Locate 12-14/HAL/" portion of line 8 and represents a request for locating, in columns 12–14, all data for the Hal Company. If the word "HAL" is located in the record, the record is selected to be passed to the next function, which is "BPW". The "BPW" portion of line 8 indicates a request to place data in the pipe, and is also a request to return to the I/O control system with the record and/or a condition code representing action to be taken by the I/O control system. An alternative programming approach for accessing the pipe fitting described with respect to FIG. 15 is presented below.

```
1.//RATES    JOB
2.//CALC     EXEC PGM=RATER
3.//INPUT    DD DSN=CUSTOMER.USAGE,DISP=OLD
4.//OUTPUT   DD DSN=BILLING.DATA,
5.//         SUBSYS=(BP01,'FIT=BPR ! locate 12-14/HAL/ !
             BPW'),
6.//         LRECL=120,BLKSIZE=32760,RECFM=FB
```

The above alternate approach avoids the overhead of data set allocation, unallocation, and the open and close processing of a file containing the pipe fitting specification. However, this alternative approach becomes less practical as the size of the fitting specification becomes larger; in fact, limitations on the maximum parameter size in the JCL naturally bound the size of the fitting specification. Use of the "FITDD" keyword is preferred over the "FIT" keyword for fitting specifications exceeding a few lines.

Figure 16:
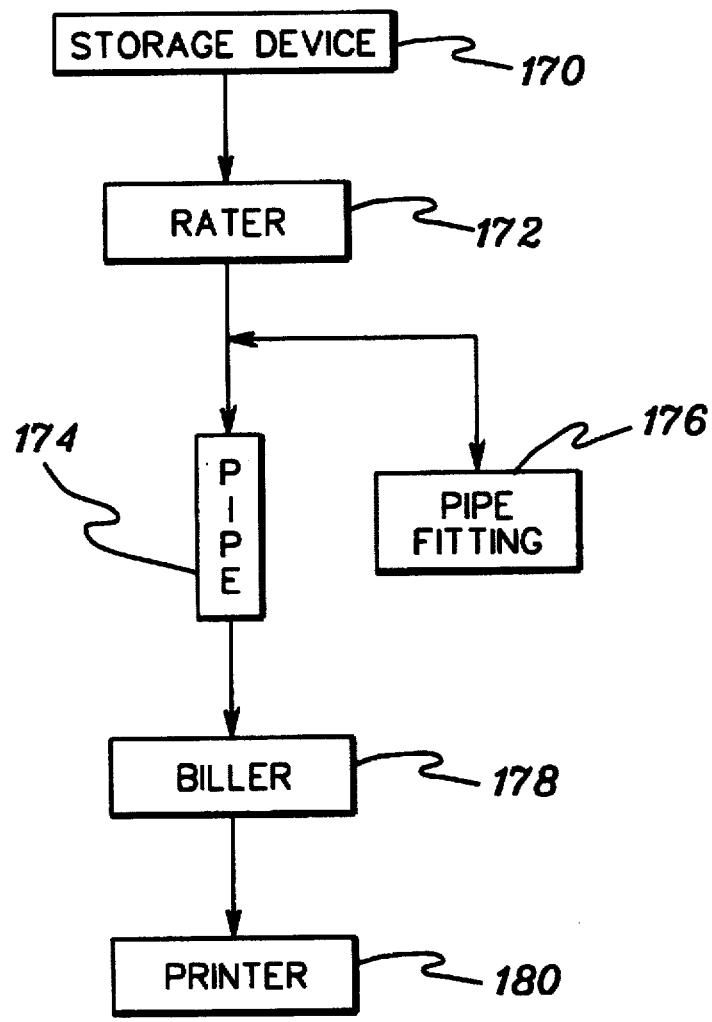
FIG. 16 is a topology diagram showing data flow between elements in an exemplary implementation of the flow diagram of FIG. 15.

FIG. 16 is a topology diagram showing data flow between elements in an exemplary implementation of the flow diagram of FIG. 15. The data indicating services used by customers is accessed from a storage device 170 by the RATER application 172, which calculates the customer charges and writes the charges to a pipe 174 as they are processed. However, prior to reaching pipe 174, the processed data is routed to a pipe fitting 176 by the I/O control system, which transfers the data to, and invokes pipe fitting 176. The pipe fitting acts on the data by selecting only the Hal Company data and returning it to the I/O control system, which writes it to pipe 174 for reading by the BILLER application 178. Pipe fitting 176 is transparent to RATER, and executes under resources owned thereby, since it is defined under the JCL defining the RATES job. Concurrent with RATER processing data and pipe fitting 176 selecting and returning selected data to pipe 174, the BILLER application reads the selected data placed back in pipe 174, formats the bill and sends it into the data stream for subsequent printing by a printer 180.

Figure 17:
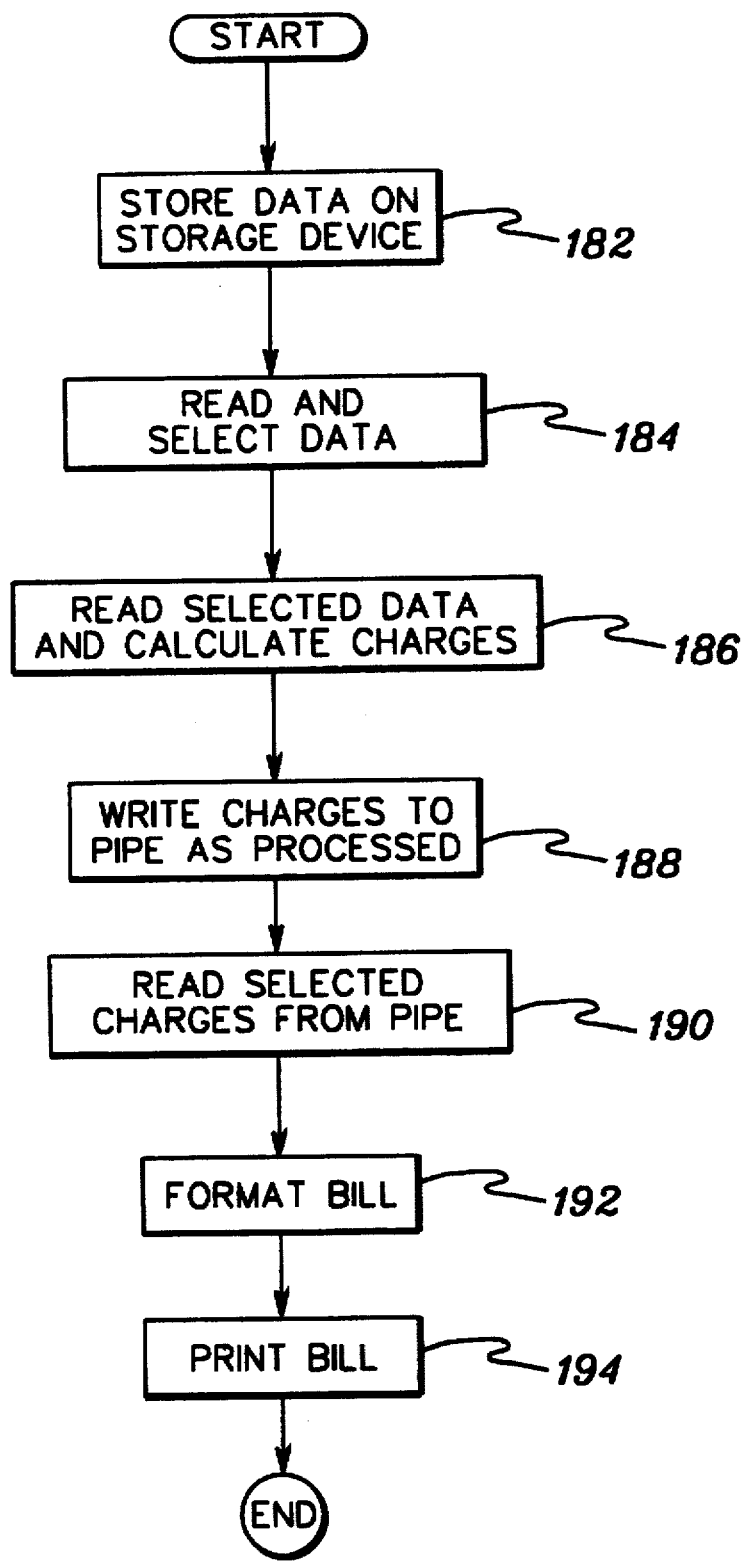
FIG. 17 is a flow diagram for the process of FIG. 14 with an added source/sink adapter, instead of the added job, to exclude records read from a data source.

A more efficient and preferred usage of the pipe fitting of FIG. 15 would be to logically place it prior to the RATER application, if possible, so that only the Hal Company data is processed by the RATER application. In this way, the data is preprocessed prior to accessing by the RATER application. FIG. 17 depicts one example of the flow associated with the Hal Company rebilling process according to the present invention where the data is preprocessed prior to invocation of the RATER application. Initially, the data indicating services used by Company X customers is stored on a storage device (STEP 182, "STORE DATA ON STORAGE DEVICE"). A source/sink adapter reads the data from the selected data source, selects out only the Hal Company data (STEP 184, "READ AND SELECT DATA"), and passes it to the RATER application for processing (STEP 186, "READ SELECTED DATA AND CALCULATE CHARGES"). In this example, the source/sink adapter employs the I/O control system to obtain data from the device using access method macros. However, when a data source/sink is not a device, the source/sink adapter need not use access methods or the I/O control system. As the charges are being calculated by the RATER application, they are passed to a pipe (STEP 188, "WRITE CHARGES TO PIPE AS PROCESSED"). Concurrent with the RATER application passing processed data into the pipe, the BILLER application reads the data from the pipe (STEP 190, "READ SELECTED CHARGES FROM PIPE"), formats it (STEP 192, "FORMAT BILL"), and sends it into the data stream for subsequent printing (STEP 194, "PRINT BILL").

An exemplary JCL program implementation of the flow diagram of FIG. 17 is presented below.

```
1.//RATES     JOB
2.//CALC      EXEC PGM=RATER
3.//INPUT     DD DSN=CUSTOMER.HAL,
4.//          SUBSYS=(BP01,'FITDD=FITTING',OPENNOW),
5.//          LRECL=120,BLKSIZE=32760,RECFM=FB
6.//OUTPUT    DD DSN=BILLING.DATA,
7.//          SUBSYS=BP01,
8.//          LRECL=120,BLKSIZE=32760,RECFM=FB
9.//DATAIN    DD DSN=CUSTOMER.USAGE,DISP=OLD
10.//FITTING DD *
11.  QSAM DATAIN ! locate 12-14 /HAL/ ! BPW
12./*
13.//BILLER    JOB
14.//STMT      EXEC PGM=BILLER
15.//INPUT     DD DSN=BILLING.DATA,
16.//          SUBSYS=BP01,
17.//          LRECL=120,BLKSIZE=32760,RECFM=FB
18.//OUTPUT    DD SYSOUT=*
```

Line 3 opens a preprocessing "half-pipe" named "customer.hal" for data going into the RATER program. The "OPENNOW" sub-parameter on line 4 of the program is used to override the BatchPipes™ system standard operation of waiting in an open state until there is an incidence of a writer-reader pair for the pipe. However, in this case, there is no writer to the pipe (it is a half-pipe), therefore, the user should not wait in the open state. On line 11, the source/sink adapter specification begins with "QSAM DATAIN", which indicates that the file defined by the JCL statement labeled "DATAIN" should be read at this point. The contents of the DATAIN file, the customer usage data on a storage device, are found on line 9 of the program. The source/sink adapter specification in this case is a bit more complicated, since a half-pipe is existing with a reader and no writer. This implementation of the source/sink adapter is more efficient than the pipe fitting used in FIG. 15, since the RATER application only calculates charges for the selected company, rather than for all companies.

Figure 18:
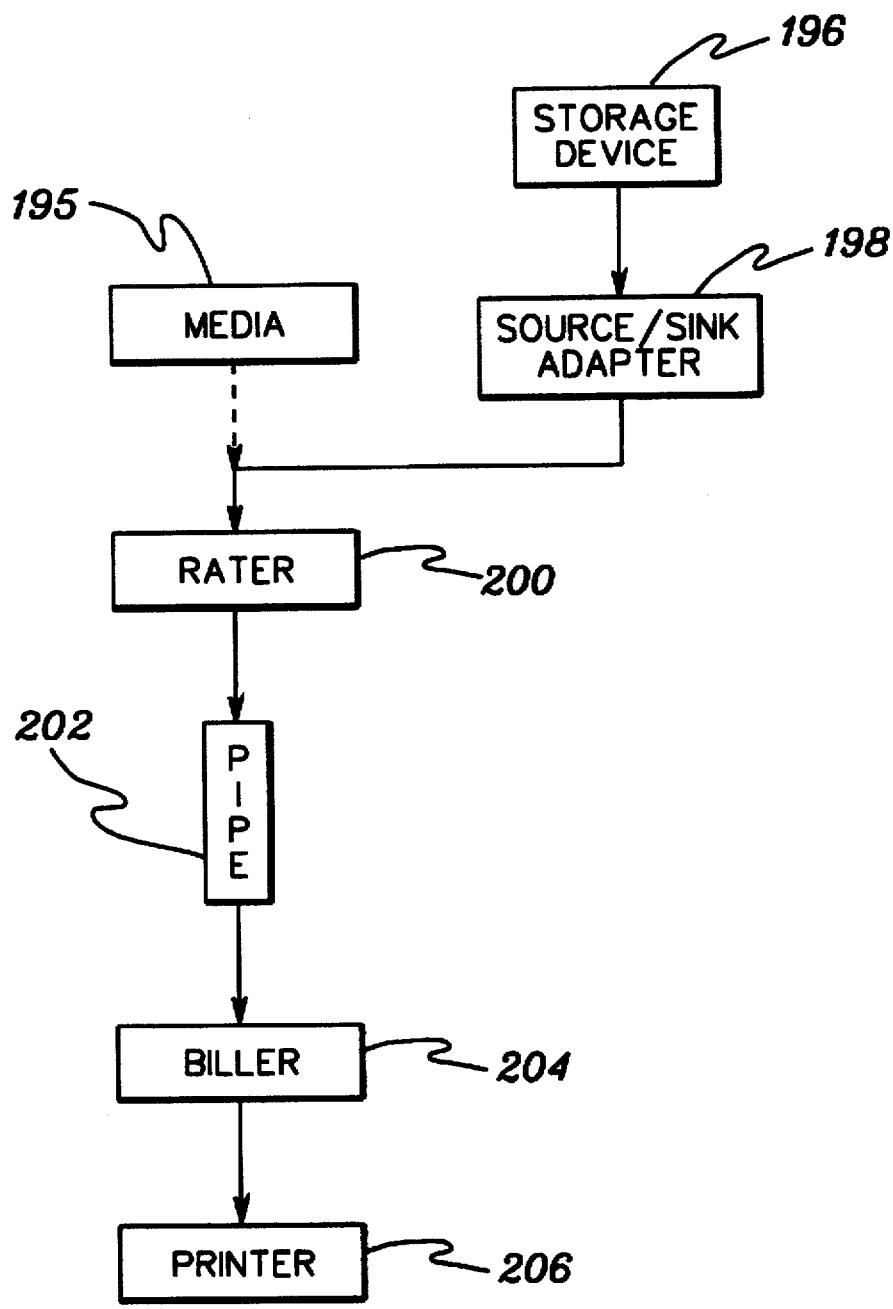
FIG. 18 is a topology diagram showing data flow between elements in an exemplary implementation of the flow diagram of FIG. 17.

FIG. 18 is a topology diagram showing data flow between the elements of an exemplary implementation of the flow diagram of FIG. 17. Assume that the RATER application has targeted some media 195 other than storage device 196 for data on which to calculate charges for services used by customers. The data indicating services used is actually accessed from storage device 196 by a source/sink adapter 198 through a half-pipe (not shown, since no physical FIFO buffer corresponds-thereto) having source/sink adapter 198 as a reader. The source/sink adapter sorts out all the Hal Company data and passes it to the RATER application 200. Source/sink adapter 198 is transparent to RATER, and executes under resources owned thereby, as indicated by the fact that it is defined in the JCL for the RATES job. The RATER application reads the Hal Company data and calculates the charges therefor. As the RATER application 200 calculates the charges, it writes them to a pipe 202 for concurrent reading by the BILLER application 204, which formats the Hal Company charges into a bill, and sends the bill into the data stream for subsequent printing by a printer 206.

As described herein, the present invention comprises a method and apparatus for acting on data in a process via an internal operating system interface from an I/O control system while refraining from adding any new applications to the process or making any coding changes to heritage applications. The event in the case of an adapter is an application request to read or write data. The data is acted on via an adapter which operates outside the application, requiring significantly less resources than the addition of another application to act on the data.

While several aspects of the present invention have been described and depicted herein, alternative aspects may be effected by those skilled in the art to accomplish the same objectives. As one example, other coding languages could be used to implement an adapter. Accordingly, it is intended by the appended claims to cover all such alternative aspects as fall within the true spirit and scope of the invention.

We claim:

1. A method for processing data in a computer system including an application, an I/O control system and an access method controlling data transfer between said application and said I/O control system, said I/O control system controlling data transfer between said access method and storage media, said method comprising steps of:

passing data to an adapter outside said application, wherein said adapter is transparent to said application;

acting on said passed data within said adapter under computer system resources owned by said application and producing an output; and directing said output away from said adapter.

2. The method of claim 1, wherein said step of passing comprises passing said data from one of said access method and said I/O control system to said adapter.

3. The method of claim 1, wherein said step of passing comprises passing said data from a data source other than said access method and said I/O control system to said adapter.

4. The method of claim 2, wherein said output comprises a return code and wherein said step of directing comprises directing said return code from said adapter to said one of said I/O control system and said access method.

5. The method of claim 2, wherein said output comprises a status indicator and wherein said step of directing comprises directing said status indicator from said adapter to said one of said I/O control system and said access method.

6. The method of claim 2, wherein said step of passing comprises passing said data from said application to said access method and from said access method to said adapter.

7. The method of claim 2, wherein said step of passing comprises passing said data from said application to said access method, from said access method to said I/O control system and from said I/O control system to said adapter.

8. The method of claim 7, wherein said system further includes a storage medium, wherein said output comprises output data, wherein said step of directing comprises directing said output data from said adapter to said I/O control system, said method further comprising a step of passing said output data from said I/O control system to said storage medium.

9. The method of claim 6, wherein said output comprises output data, and wherein said step of directing comprises directing said output data from said adapter to said access method.

10. The method of claim 9, wherein said computer system further comprises a storage medium, said method further comprising steps of:

passing said output data from said access method to said I/O control system; and passing said output data from said I/O control system to said storage medium.

11. The method of claim 1, wherein said computer system further includes a storage medium, and wherein said step of passing comprises passing said data from said storage medium to said I/O control system and from said I/O control system to said adapter.

12. The method of claim 11, wherein said output comprises output data, and wherein said step of directing comprises directing said output data from said adapter to said I/O control system.

13. The method of claim 12 further comprising steps of:

passing said output data from said I/O control system to said access method; and passing said output data from said access method to said application.

14. The method of claim 1, wherein said computer system further includes a storage medium, and wherein said step of passing comprises passing said data from said storage medium to said I/O control system, from said I/O control system to said access method and from said access method to said adapter.

15. The method of claim 14, wherein said output comprises output data, said method further comprising steps of:

passing said output data from said adapter to said access method; and passing said output data from said access method to said application.

16. The method of claim 1, wherein said data originates with said application and has an intended destination other than said adapter, wherein said output comprises output data, and wherein said step of directing comprises directing said output data from said adapter to a data sink different from said intended destination.

17. The method of claim 1, wherein said adapter is defined via an interpreted language, said adapter executing without being compiled, assembled and link edited.

18. A method for processing data in a computer system including an application, an I/O control system, a storage medium and an access method controlling data transfer between said application and said I/O control system, said I/O control system controlling data transfer between said storage medium and said access method, said method comprising steps of:

(a) issuing a read request from said application, said read request targeting said storage medium;

(b) passing data from a data source other than said storage medium to an adapter outside said application, wherein said adapter is transparent to said application; and (c) acting on said passed data within said adapter under computer system resources owned by said application and producing an output.

19. The method of claim 18 further comprising a step of:

(d) passing said output from said adapter to one of said I/O control system and said access method.

20. The method of claim 19, wherein said output comprises output data, and wherein said step (d) comprises passing said output data to said I/O control system, said method further comprising steps of:

(e) passing said output data from said I/O control system to said access method; and (f) passing said output data from said access method to said application.

21. The method of claim 19, wherein said output comprises output data, and wherein said step (d) comprises passing said output data to said access method, said method further comprising a step of:

(e) passing said output data from said access method to said application.

22. The method of claim 19, wherein said output comprises a return code and wherein said step (d) comprises passing said return code from said adapter to said one of said I/O control system and said access method.

23. The method of claim 19, wherein said output comprises a status indicator and wherein said step (d) comprises passing said status indicator from said adapter to said one of said I/O control system and said access method.

24. A system for processing data, comprising:
an application;
an I/O control system;
an access method controlling data transfer between said application and said I/O control system, said I/O control system controlling data transfer between said access method and storage media;
means for passing data to an adapter outside said application, wherein said adapter is transparent to said application
means for acting on said passed data within said adapter under system resources owned by said application and producing an output; and
means for directing said output away from said adapter.

25. The system of claim 24, wherein said means for passing comprises means for passing said data from one of said access method and said I/O control system to said adapter.

26. The system of claim 24, wherein said means for passing comprises means for passing said data from a data source other than said access method and said I/O control system to said adapter.

27. The system of claim 25, wherein said output comprises a return code or a status indicator, and wherein said means for directing comprises means for directing said return code or said status indicator from said adapter to said one of said I/O control system and said access method.

28. The system of claim 25, wherein said means for passing comprises means for passing said data from said application to said access method and from said access method to said adapter.

29. The system of claim 25, wherein said means for passing comprises means for passing said data from said application to said access method, from said access method to said I/O control system and from said I/O control system to said adapter.

30. The system of claim 29, wherein said system comprises a storage medium, wherein said output comprises output data, and wherein said means for directing comprises means for directing said output data from said adapter to said I/O control system, said system further comprising means for passing said output data from said I/O control system to said storage medium.

31. The system of claim 28, wherein said output comprises output data, and wherein said means for directing comprises means for directing said output data from said adapter to said access method.

32. The system of claim 31, wherein said system further includes:
a storage medium;
means for passing said output data from said access method to said I/O control system; and
means for passing said output data from said I/O control system to said storage medium.

33. The system of claim 24 further comprising a storage medium, and wherein said means for passing comprises:
means for passing said data from said storage medium to said I/O control system; and
means for passing said data from said I/O control system to said adapter.

34. The system of claim 33, wherein said output comprises output data, and wherein said means for directing comprises means for directing said output data from said adapter to said I/O control system.

35. The system of claim 34, further comprising:
means for passing said output data from said I/O control system to said access method; and
means for passing said output data from said access method to said application.

36. The system of claim 24, further comprising a storage medium, wherein said means for passing comprises:
means for passing said data from said storage medium to said I/O control system;
means for passing said data from said I/O control system to said access method; and
means for passing said data from said access method to said adapter.

37. A system for processing data, comprising:
an application;
an I/O control system;
a storage medium;
an access method controlling data transfer between said application and said I/O control system, said I/O control system controlling data transfer between said storage medium and said access method;
means for issuing a read request from said application, said read request targeting said storage medium;
means for passing data from a data source other than said storage medium to an adapter outside said application, wherein said adapter is transparent to said application; and
means for acting on said passed data within said adapter under system resources owned by said application and producing an output.

38. The system of claim 37 further comprising:
means for directing said output away from said adapter.

39. The system of claim 38, wherein said output comprises output data, and wherein said means for directing comprises means for passing said output data to said I/O control system, said system further comprising:
means for passing said output data from said I/O control system to said access method; and
means for passing said output data from said access method to said application.

40. The system of claim 38, wherein said output comprises output data, and wherein said means for directing comprises means for passing said output data to said access method, said system further comprising:
means for passing said output data from said access method to said application.

41. The system of claim 38, wherein said output comprises a return code and wherein said means for directing comprises means for passing said return code from said adapter to said one of said I/O control system and said access method.

42. The system of claim 38, wherein said output comprises a status indicator and wherein said means for directing comprises means for passing said status indicator from said adapter to said one of said I/O control system and said access method.

43. The system of claim 38, wherein said data originates with said application and has an intended destination other than said adapter, wherein said output comprises output data, and wherein said means for directing comprises means for passing said output data from said adapter to a data sink different from said intended destination.

44. The system of claim 37, wherein said adapter is defined outside said application, said I/O control system, said storage medium and said access method via an interpreted language, and wherein said means for acting on comprises means for executing without compiling, assembling and link editing.

* * * * *